(12) United States Patent
Honda et al.

(10) Patent No.: US 6,412,076 B1
(45) Date of Patent: Jun. 25, 2002

(54) SIGNAL PROCESSING APPARATUS AND IMAGE SENSING APPARATUS

(75) Inventors: Hirofumi Honda, Machida; Keiji Sato, Tokyo, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/372,437

(22) Filed: Aug. 11, 1999

(30) Foreign Application Priority Data

Aug. 25, 1998 (JP) ............................................ 10-239105

(51) Int. Cl.$^7$ ................................................. G06F 13/00
(52) U.S. Cl. ........................ 713/323; 382/312; 713/320
(58) Field of Search .................................. 713/323, 324, 713/320; 710/8, 10, 62, 261; 709/220–222, 250; 712/35; 370/254; 382/312; 700/90

(56) References Cited

U.S. PATENT DOCUMENTS 5,980,078 A * 11/1999 Krivoshein et al.
6,098,116 A * 8/2000 Nixon et al.

* cited by examiner

*Primary Examiner*—Gopal C. Ray
(74) *Attorney, Agent, or Firm*—Morgan & Finnegan, LLP

(57) ABSTRACT

Disclosed is a signal processing apparatus in which it is possible to obtain a favorable system construction in a case where the main unit of the apparatus and an external device have been connected via a digital interface in the recording standby mode. The signal processing apparatus is capable of constructing a network by being connected to a plurality of external devices. In a case where at least connection to an external device has been sensed when the apparatus is in an operation standby state, power shutdown is restricted to thereby curtail bus reset of the network.

16 Claims, 25 Drawing Sheets

CABLE CROSS SECTION

EXCLUSIVE-OR OF Data AND Strobe

BRANCH : NODE TO WHICH TWO OR MORE NODES ARE CONNECTED

LEAF : NODE HAVING ONLY ONE PORT CONNECTED

□ : PORT
c : PORT THAT CORRESPONDING TO NODE OF CHILD
p : PORT THAT CORRESPONDING TO NODE OF PARENT

REQUEST FOR BUS ACCESS

BUS ACCESS GRANTED

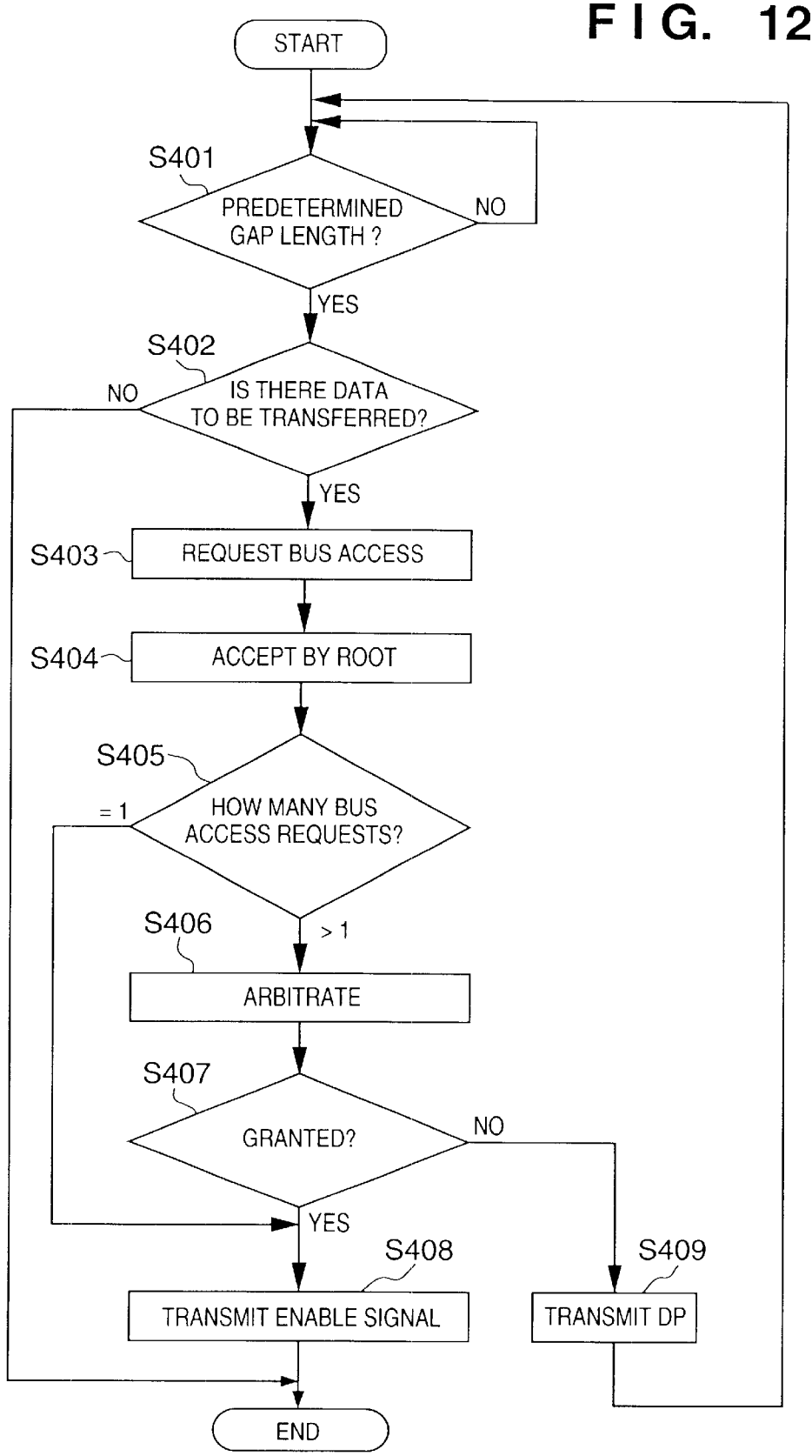

SIGNAL PROCESSING APPARATUS AND IMAGE SENSING APPARATUS

BACKGROUND OF THE INVENTION

This invention relates to an image sensing apparatus such as a combination camera-VTR (camcorder) equipped with an interface for outputting a signal to external equipment, or to a signal processing apparatus which includes such an apparatus.

In a camcorder, which is one example of an image sensing apparatus in the prior art, it is necessary to avoid wear of the recording tape due to contact with a recording head in a situation where the recording head is standing by tracing the same path on the recording tape, as when the camcorder is in the recording standby mode. Further, there is need to minimize consumption of the battery employed as the power supply. For these reasons, the system architecture of such an apparatus is designed to realize conservation of power and prevention of tape wear.

FIG. 23 is a block diagram illustrating the principal components of a system for controlling a camcorder according to the prior art.

As shown in FIG. 23, the system includes a recording start key 1 provided so that the operator may select the start of recording; a camera controller 2 for capturing image information by controlling a lens unit (not shown); a signal processor 3 for encoding the image information, which has been received from the camera controller 2, as digital image data; a recorder controller 4 for controlling a drum motor 5, capstan motor 6 and recording head 7 to record the digital image data, which has been obtained by the encoding processing of signal processor 3, on magnetic recording tape (not shown) serving as a recording medium; and a digital interface 8 for outputting the digital image data, which has been obtained by the encoding processing of signal processor 3, to an external device. The digital interface 8 has a connection terminal 8a.

The system further includes a power supply unit 9 for supplying peripheral blocks with electric power, and a system controller 10 for controlling the camera controller 2 in conformity with operating-mode selection information obtained from the recording start key 1, which is part of an input unit, the signal processor 3, the recorder controller 4, the digital interface 8 and the power supply unit 9.

FIG. 24 is a flowchart illustrating the operation of the system controller 10 in a case where transition to a recording standby mode has been selected in response to the operator pressing a key. The control operation of the system controller 10 in the recording standby mode will be described with reference to FIG. 24. The recording standby mode refers to a mode in which the camera controller 2 and signal processor 3 are in a state identical with that which prevailed in the recording mode, while the recorder controller 4 places only the drum motor 5 in a state the same as that which prevailed in the recording mode (i.e., controls the drum motor 5 so that it rotates at the same rpm as that in the recording mode) and places the capstan motor 6 and recording head 7 in the OFF state.

When the transition to the recording standby mode is selected in response to the operator pressing a key, the system controller 10 enables a timer interrupt at step S01 in order to measure recording standby time.

The timer interrupt results in the generation of an interrupt at any set time period. A shutdown timer is incremented at step S31, which is within the interrupt, as shown in FIG. 25.

Next, the system controller 10 monitors the recording start key at step S02 and, if an input from this key is sensed at step S03, shifts the mode from the recording standby mode to the recording mode at step S24. By controlling the recorder controller in the recording mode, the capstan roller is driven into rotation and photographic image data is recorded on the magnetic recording tape via the recording head.

The timer interrupt is disabled and the shutdown timer is cleared at step S06. If a key input is not sensed at step S03, the shutdown timer is monitored at step S04. If it is determined that the value measured by the shutdown timer is less than 5 minutes, control returns to step S02. On the other hand, if it is determined that the recording standby mode has continued for five minutes or more, a transition from the recording standby mode to a power shutdown mode is made at step S05. By controlling the power supply unit 9 in the power shutdown mode, the supply of power to the camera controller 2, signal processor 3, recorder controller 4 and digital interface 8 is turned off. Next, at step S06, the timer interrupt is disabled and the shutdown timer is cleared. This series of processing steps completes the operation for conserving power and preventing tape wear.

Many camcorders are equipped with a serial bus in compliance with IEEE 1394-1995 as a digital interface for outputting digital image data to an external device. (This IEEE standard shall be referred to simply as "IEEE 1394" below.) A cable in compliance with IEEE 1394 is composed of two twisted-pair signal lines (to which it is possible to add a power-supply line). In order that the devices in a communications system can recognize one another, a unique ID is set for each device. Furthermore, in order for communication to be controlled over a network, ID information referred to as a node ID (physical address) is set for each device.

If the bus constructing the network undergoes a bus reset, the node IDs are set again. That is, a processing operation for automatically recognizing the make-up of a network becomes necessary when power is introduced or in response to detection of addition/deletion of a network device or of a reset command from an individual device. The ID of each device is set again in such case. Reconfiguration of the network is carried out by this resetting of the network device IDs.

Thus, the digital interface 8, which is a structural component in the prior-art arrangement described above, is in compliance with IEEE 1394. Assume that the digital interface 8 has been connected to an external device. If, under these conditions, the camcorder is forcibly shut down while in the recording standby state, a problem which arises is that in interface networking, a bus reset is generated in order to reconfigure the network and, as a result, processing for interfacing all devices present on the network is suspended.

SUMMARY OF THE INVENTION

Accordingly, an object of the present invention is to provide a signal processing apparatus and an image sensing apparatus in which it is possible to obtain a favorable system construction in a case where the main unit of the apparatus and an external device have been connected via a digital interface in the recording standby mode.

According to the present invention, the foregoing object is attained by providing a signal processing apparatus capable of constructing a network by being connected to a plurality of external devices, wherein in a case where at least connection to an external device has been sensed when the apparatus is in an operation standby state, power shutdown is restricted to thereby curtail bus reset of the network.

Further, according to the present invention, the foregoing object is attained by providing an image sensing apparatus comprising: image signal processing means for generating and processing image information; interface means for outputting a signal, which is output by the image signal processing means, to an external device; and sensing means for sensing connection of the interface means to an external device, wherein depending upon status of a connection to an external device, a transition is made from a first operating mode, in which the apparatus stands by for operation of the image signal processing means, to a second operating mode in which the image signal processing means is partially shut down or to a third operating mode in which power to the apparatus is cut off.

The present invention further provides a method of controlling a signal processing apparatus that is capable of constructing a network by being connected to a plurality of external devices, wherein in a case where at least connection to an external device has been sensed when the apparatus is in an operation standby state, the apparatus is controlled so as to restrict power shutdown.

The present invention further provides a method of controlling an image sensing apparatus having image signal processing means for generating and processing image information, interface means for outputting a signal, which is output by the image signal processing means, to an external device, and sensing means for sensing connection of the interface means to the external device, wherein the apparatus is controlled in dependence upon status of a connection to an external device in such a manner that a transition is made from a first operating mode, in which the apparatus stands by for operation of the image signal processing means, to a second operating mode in which the image signal processing means is partially shut down or to a third operating mode in which power to the apparatus is cut off.

Further, a storage medium according to the present invention in accordance with a first aspect thereof stores a control program for controlling a signal processing apparatus capable of constructing a network by being connected to a plurality of external devices, wherein the control program has code of a step of restricting power shutdown in a case where at least connection to an external device has been sensed when the apparatus is in an operation standby state.

Further, a storage medium according to the present invention in accordance with a second aspect thereof stores a control program for controlling an image sensing apparatus having image signal processing means for generating and processing image information, interface means for outputting a signal, which is output by the image signal processing means, to an external device, and sensing means for sensing connection of the interface means to an external device, wherein the control program has a code of a step of causing a transition from a first operating mode, in which the apparatus stands by for operation of the image signal processing means, to a second operating mode in which the image signal processing means is partially shut down or to a third operating mode in which power to the apparatus is cut off, the transition depending upon status of a connection to an external device.

Other objects and advantages besides those discussed above shall be apparent to those skilled in the art from the description of a preferred embodiment of the invention which follows. In the description, reference is made to the accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 12 is a flowchart useful in describing arbitration;

DESCRIPTION OF THE PREFERRED EMBODIMENTS

Preferred embodiments of the present invention will now be described with reference to the drawings.

First Embodiment

Figure 1:
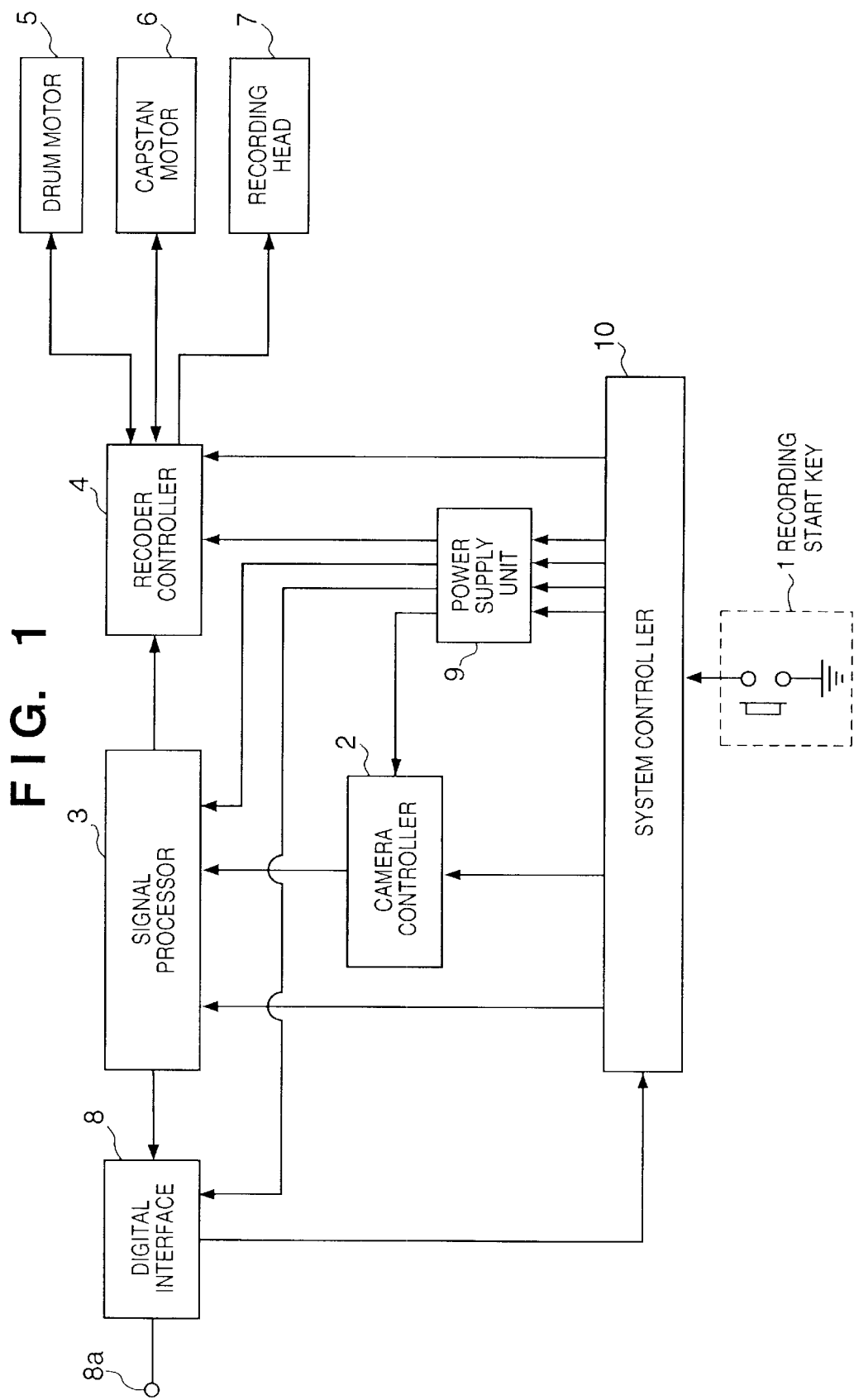
FIG. 1 is a block diagram showing the principal components of an image sensing apparatus according to first and second embodiments of the present invention.
Figure 23:
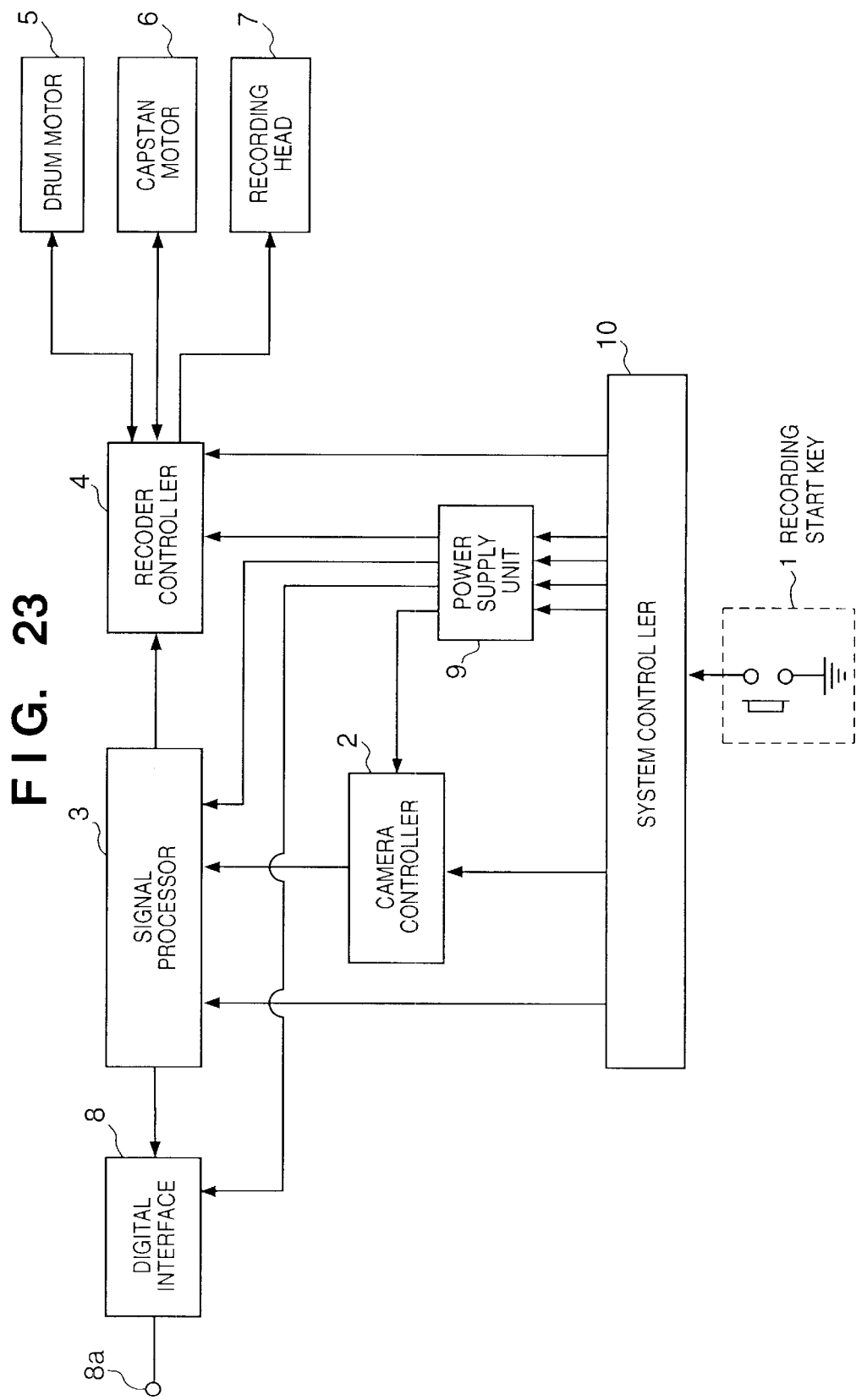
FIG. 23 is a block diagram showing the principal components of an image sensing apparatus according to the prior art.
Figure 24:
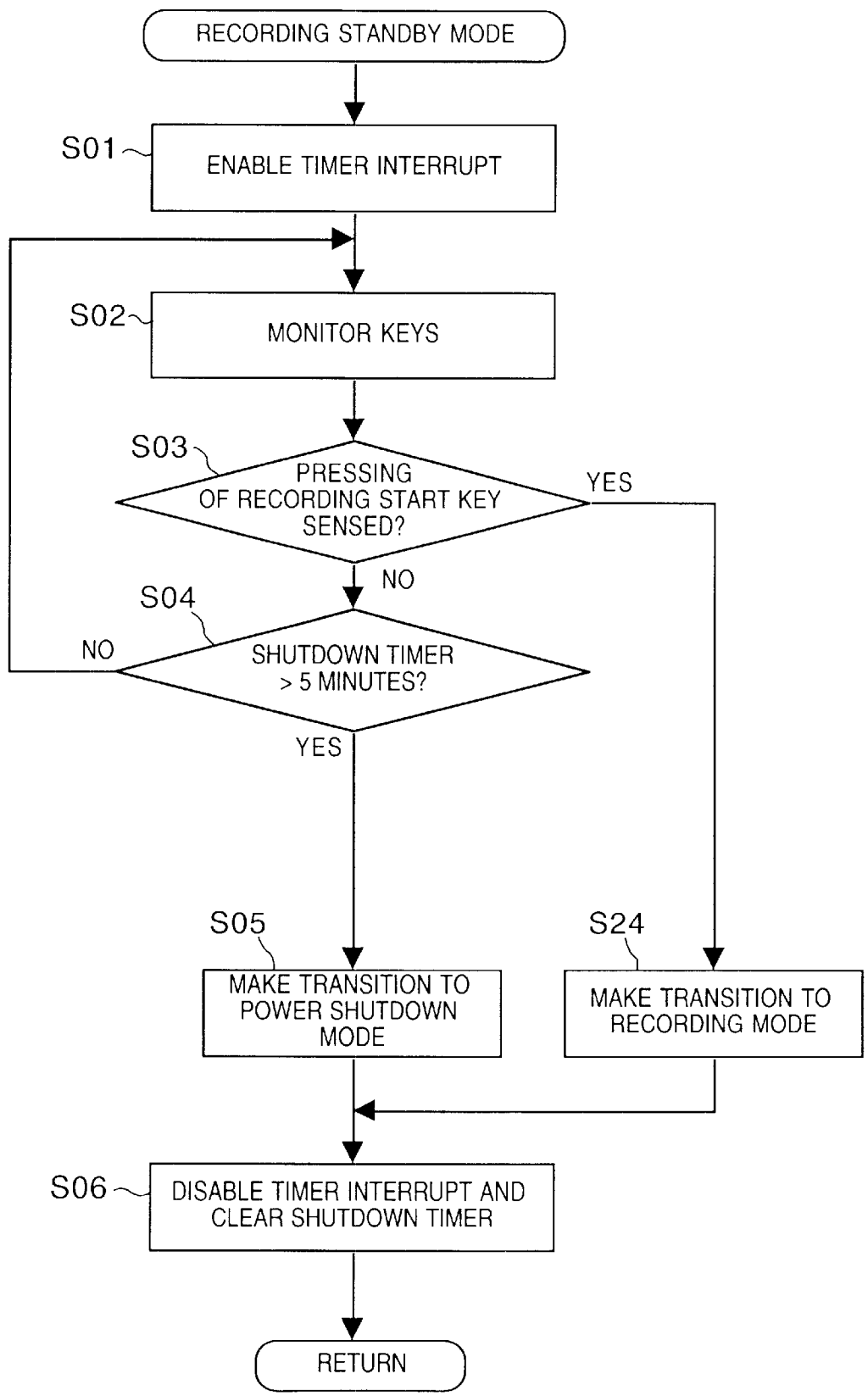
FIG. 24 is a flowchart illustrating the operation of a system controller which controls the image sensing apparatus according to the prior art.
Figure 25:
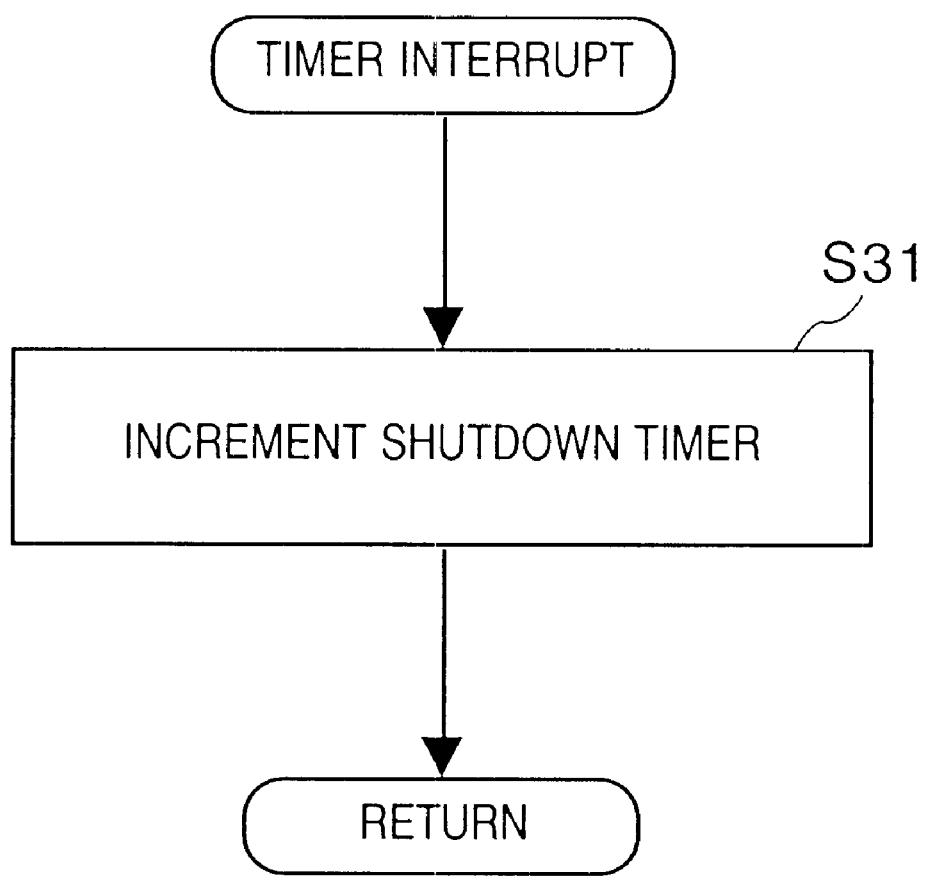
FIG. 25 is a flowchart useful in describing a timer interrupt step in the image sensing apparatus according to the prior art.

FIG. 1 is a block diagram showing the principal components of a combination camera-VTR (a "camcorder" hereafter) equipped with a digital interface function and to which the first embodiment of the invention is applied. This arrangement is obtained by additionally providing the conventional control system shown in FIG. 23 with a function for sensing the status of the connection to an external device via the digital interface 8 and a function for outputting the result of such sensing to the system controller 10.

Further, this embodiment is implemented by an arrangement which employs a serial bus in compliance with the IEEE-1394 standard as the digital interface 8. The stipulations of IEEE 1394 will now be described.

<Overview of IEEE-1394 Technology>

The appearance of digital VTRs and DVDs for home use has been accompanied by the need for support when transferring video and audio data in real time and in great quantity in terms of the information contained. An interface capable of high-speed data transfer is required to transfer audio and video data in real time and load the data in a personal computer or transfer it to another digital device. An interface that has been developed in view of the foregoing is the High-Performance Serial Bus in compliance with IEEE 1394-1995. This bus will be referred to as a "1394 serial bus" below.

Figure 2:
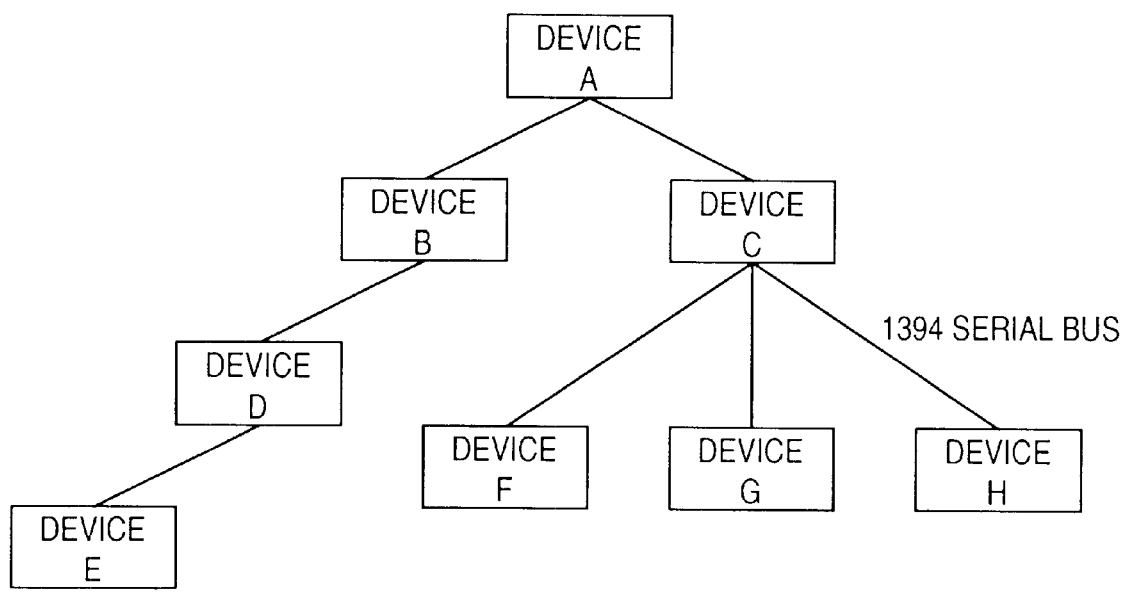
FIG. 2 is a diagram,showing a networking system constructed using a 1394-compliant serial bus.

FIG. 2 illustrates an example of a networking system constructed using the 1394 serial bus. This system has devices A, B, C, D, E, F, G and H. Twisted-pair cables of the 1394 serial bus connect devices A and B; A and C; B and D; D and E; C and F; C and G; and C and H. Examples of the devices A to H are a personal computer, digital VTR, DVD, digital camera, hard disk and monitor.

The scheme for connecting these devices can be a mixture of a daisy chaining and node branching. A high degree of freedom in making the connections is possible. Each device has its own ID and by, recognizing one another based upon their IDs, the devices construct one network over an area connected by the 1394 serial bus. By simply interconnecting adjacent devices in succession by one 1394 serial-bus cable connected between adjacent devices, each device functions as a relay and the devices in their entirety construct one network. When the cable is connected to a device through a plug-and-play function, which is one feature of a 1394 serial bus, device recognition and recognition of the status of a connection is performed automatically.

In the system shown in FIG. 2, devices can be deleted from or added to the network. At such time bus reset is performed automatically, the network configuration that prevailed thus far is reset and then a new network is constructed afresh. This function makes it possible to set up a network at any time and for the network to identify the devices constructing it.

Further, 100, 200 and 400 Mbps are available as the data transfer speeds. Devices having higher transfer speeds support lower transfer speeds and are compatible with the devices of lower speed.

The data transfer modes available are an asynchronous transfer mode for transferring asynchronous data such as control signals, and an isochronous transfer mode for transferring isochronous data such as real-time video and audio data. In each cycle (usually 125 $\mu$s), the asynchronous data and isochronous data are mixed and transferred in one cycle, while priority is given to transfer of the isochronous data, following transfer of a cycle-start packet (CSP) that indicates the start of the cycle.

Figure 3:
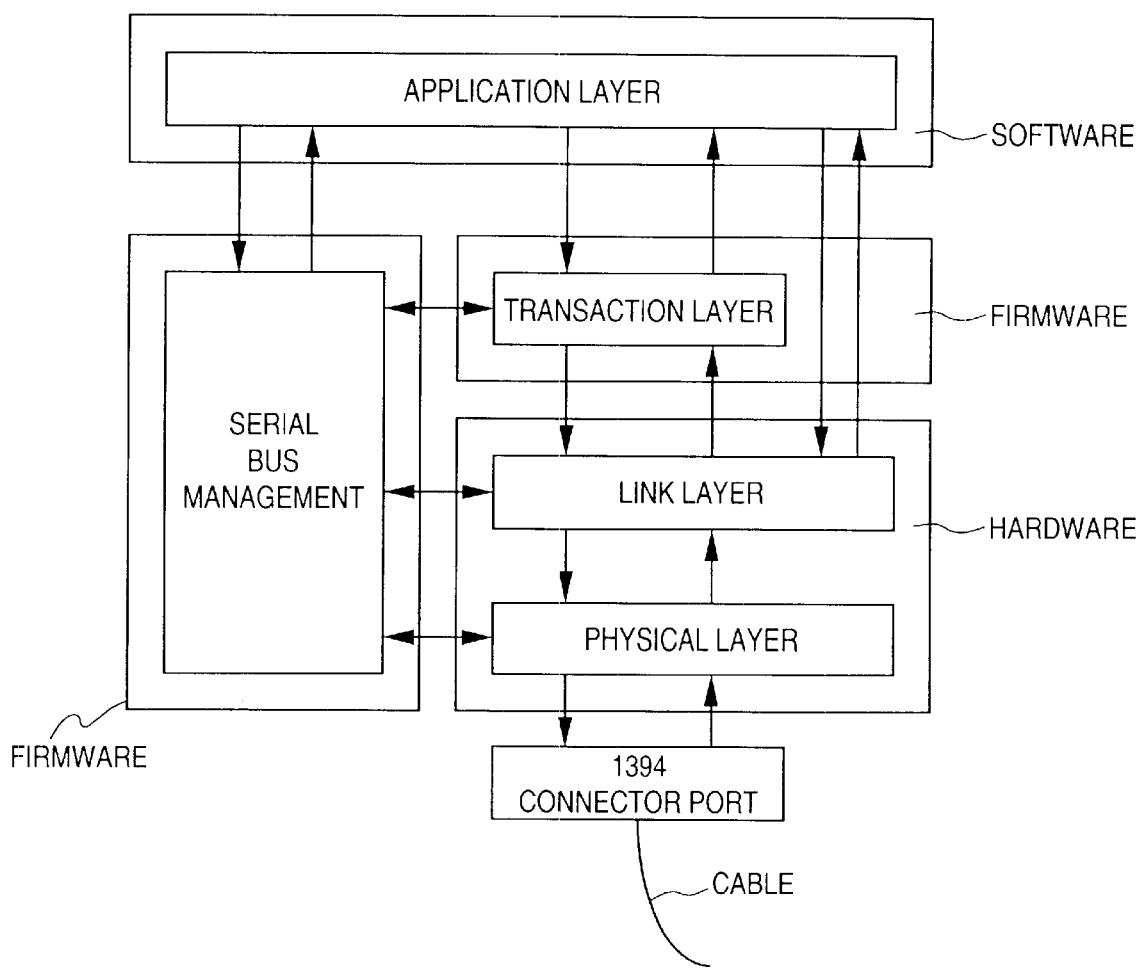
FIG. 3 is a diagram showing the structural components of the 1394-compliant serial bus.

FIG. 3 illustrates the structural components of the 1394 serial bus.

The 1394 serial bus has a layered (hierarchical) structure overall. As shown in FIG. 3, the most basic hardware component is the cable of the 1394 serial bus. The cable has a connector port to which the cable is connected. A physical layer and a link layer are the higher layers of the hardware.

In practical terms, the hardware is constituted by interface chips, of which the physical layer performs encoding and connector-related control, etc., and the link layer performs packet transfer and cycle-time control, etc.

The firmware includes a transaction layer for managing data to be transferred (transacted) and for issuing instructions such as read and write instructions. Serial-bus management is for managing the status of connections and the ID of each connected device as well as the configuration of the network.

The hardware and firmware make up the essential structure of the 1394 serial bus. The software constitutes an application layer that differs depending upon the software used. The application layer decides how data is placed on the interface. For example, this is stipulated by a protocol such as an audio-video protocol.

The foregoing sets forth the structure of the 1394 serial bus.

Figure 4:
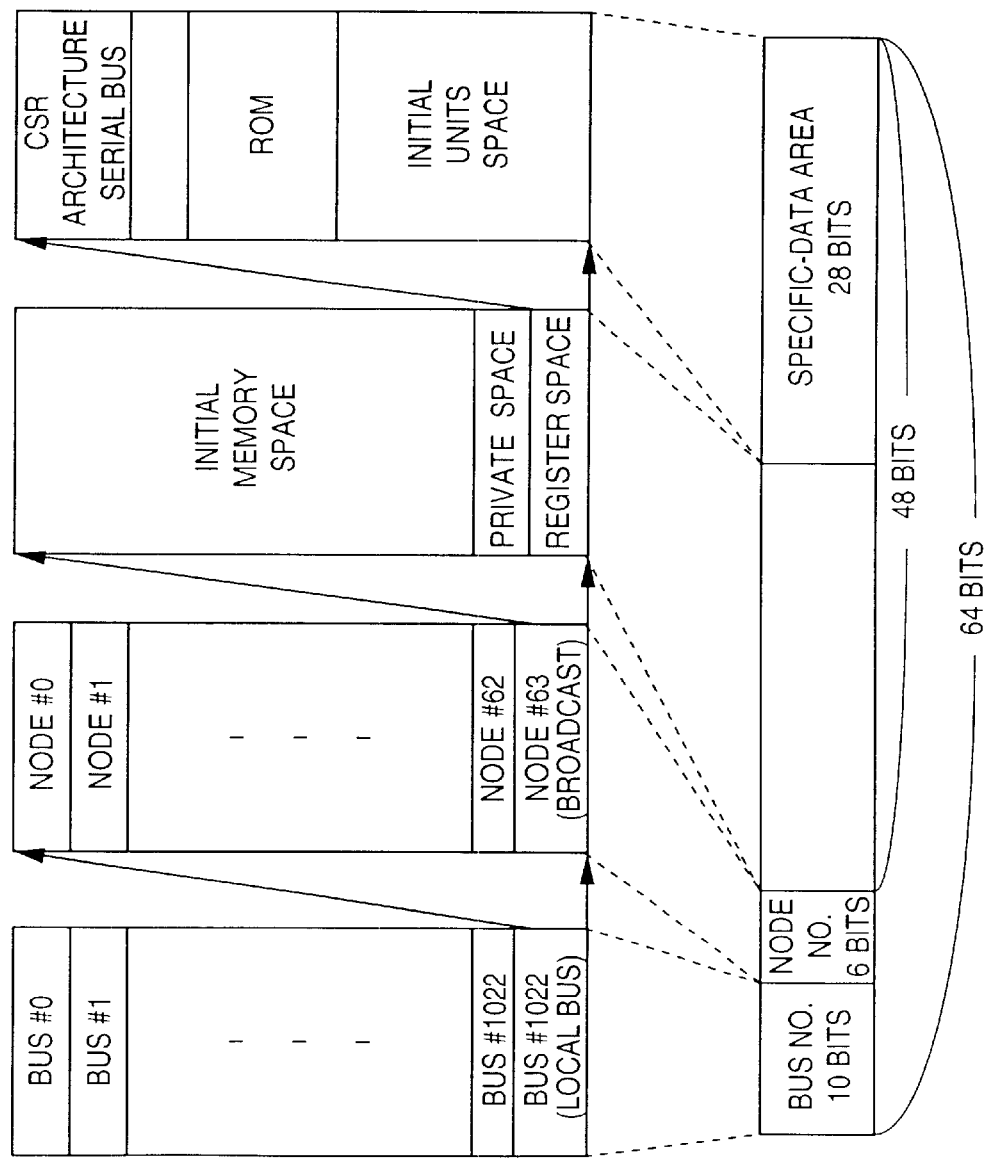
FIG. 4 is a diagram showing the address space of the 1394-compliant serial bus.

FIG. 4 illustrates the address space of the 1394 serial bus.

Each device (node) connected to the 1394 serial bus always possesses a 64-bit address that is specific to the node. Storing these addresses in a ROM makes it possible for a node's own address and for the node addresses of other nodes to be recognized at all times. This also makes it possible to perform communication in which the other party is specified. Addressing a 1394 serial bus is performed in compliance with the standard of IEEE 1212. An address is set using the first 10 bits to specify a bus number and the next six bits to specify a node ID number. The remaining 48 bits constitute address width given to a device and can be used as the specific address space. The last 28 bits of these 48 bits serve as an area for specific data and store information for identifying each device and for designating conditions of use.

The foregoing is an overview the 1394 serial bus technology.

The features of the 1394 serial bus will now be described in greater detail.

<Electrical Specifications of the 1394 Serial Bus>

Figure 5:
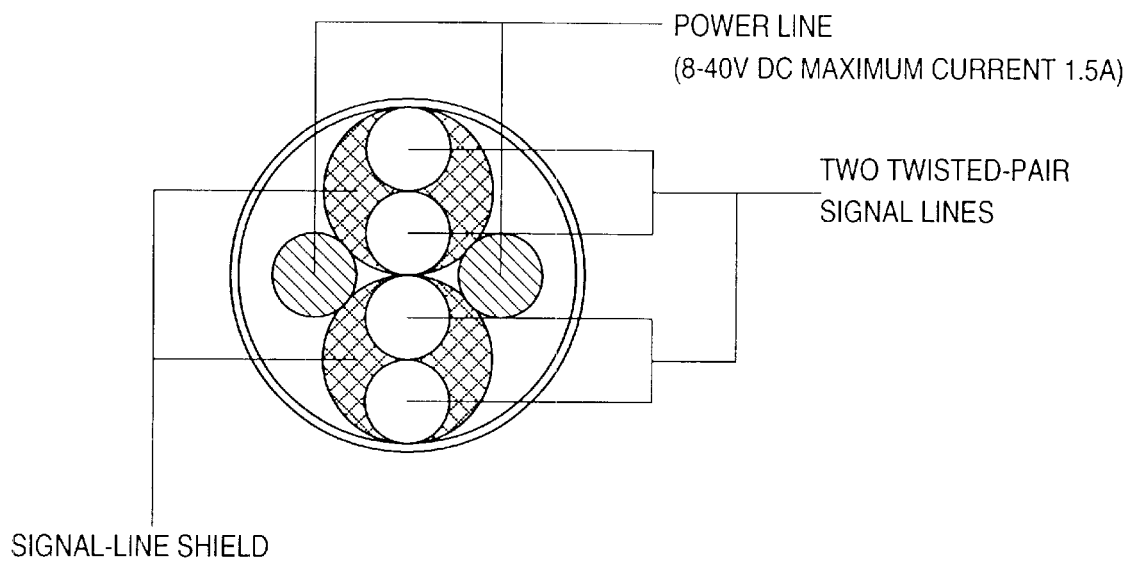
FIG. 5 is a sectional view of the cable of the 1394-compliant serial bus.

FIG. 5 is a sectional view illustrating the 1394 serial bus cable.

The connection cable of the 1394 serial bus is internally provided with a power-supply line in addition to two twisted-pair signal conductors. This makes it possible to supply power to a device not having a power supply and to a device whose voltage has dropped due to failure. According to specifications, the voltage of the power that flows through the power-supply line is 8 to 40 V and the current is a maximum of 1.5 A DC.

<DS-link Coding>

Figure 6:
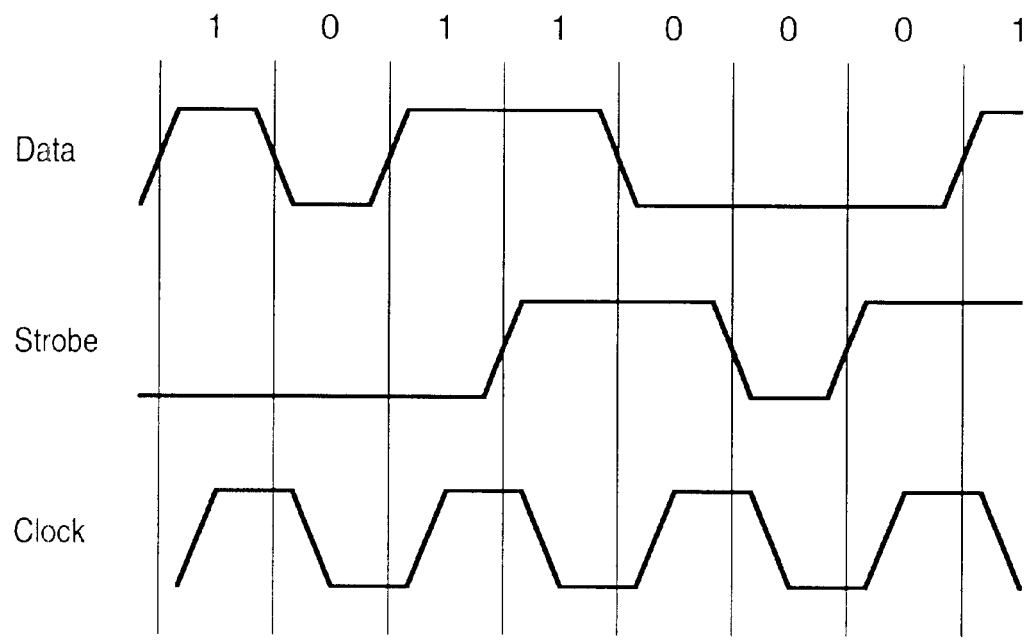
FIG. 6 is a diagram useful in describing the DS-link coding scheme of a data transfer format.

FIG. 6 is a diagram useful in describing the DS-link coding scheme of a data transfer format employed in the 1394 serial bus.

The 1394 serial bus employs DS-link (Data/Strobe link) coding. DS-link coding is suited to high-speed serial-data communication. This requires two twisted-pair signal lines. One twisted-pair mainly sends data and the other sends a strobe signal. On the receiving side, a clock can be reproduced by taking the exclusive-OR between the transmitted data and strobe.

Using the DS-link coding scheme is advantageous in that transmission efficiency is higher in comparison with other serial-data transmission schemes and in that the scale of the controller LSI circuitry can be reduced because a PLL circuit is unnecessary. Furthermore, when there is no data to be transferred, there is no need to send information indicative of the idle state. Accordingly, by placing the transceiver circuit of each device in the sleep state, less power is consumed.

<Bus-reset Sequence>

In the 1394 serial bus, a node ID is assigned to each connected device (node) so that the devices may be recognized as constituting a network. If there is a change in the network configuration, e.g., a change caused by increasing or decreasing the number of nodes by plugging in or unplugging a node or by turning a node power supply on or off, recognition of the new network configuration becomes necessary. At such time each node that has sensed the change transmits a bus-reset signal over the bus and a mode in which the new network configuration recognized is established. The method of sensing the change involves sensing a change in bias voltage on the board of the 1394 port.

Upon being sent a bus reset signal from a certain node, the physical layer of each node receives the bus-reset signal and, at the same time, reports occurrence of the bus reset to the link layer and sends the bus-reset signal to the other nodes. After all nodes have eventually sensed the bus-reset signal, bus reset is activated.

Bus reset can also be activated by hardware detection of cable plugging/unplugging and of network anomalies and by issuing an instruction directly to the physical layer by host control from the protocol. When bus reset is activated, data transfer is suspended temporarily and is resumed on the basis of the new network configuration after the completion of reset.

The foregoing is a description of the bus-reset sequence.

<Node-ID Decision Sequence>

In order for each of the nodes to construct the new network configuration after bus reset, an operation for assigning an ID to each node begins. The usual sequence from bus reset to determination of node IDs will be described with reference to the flowcharts of FIGS. 7, 8 and 9.

Figure 7:
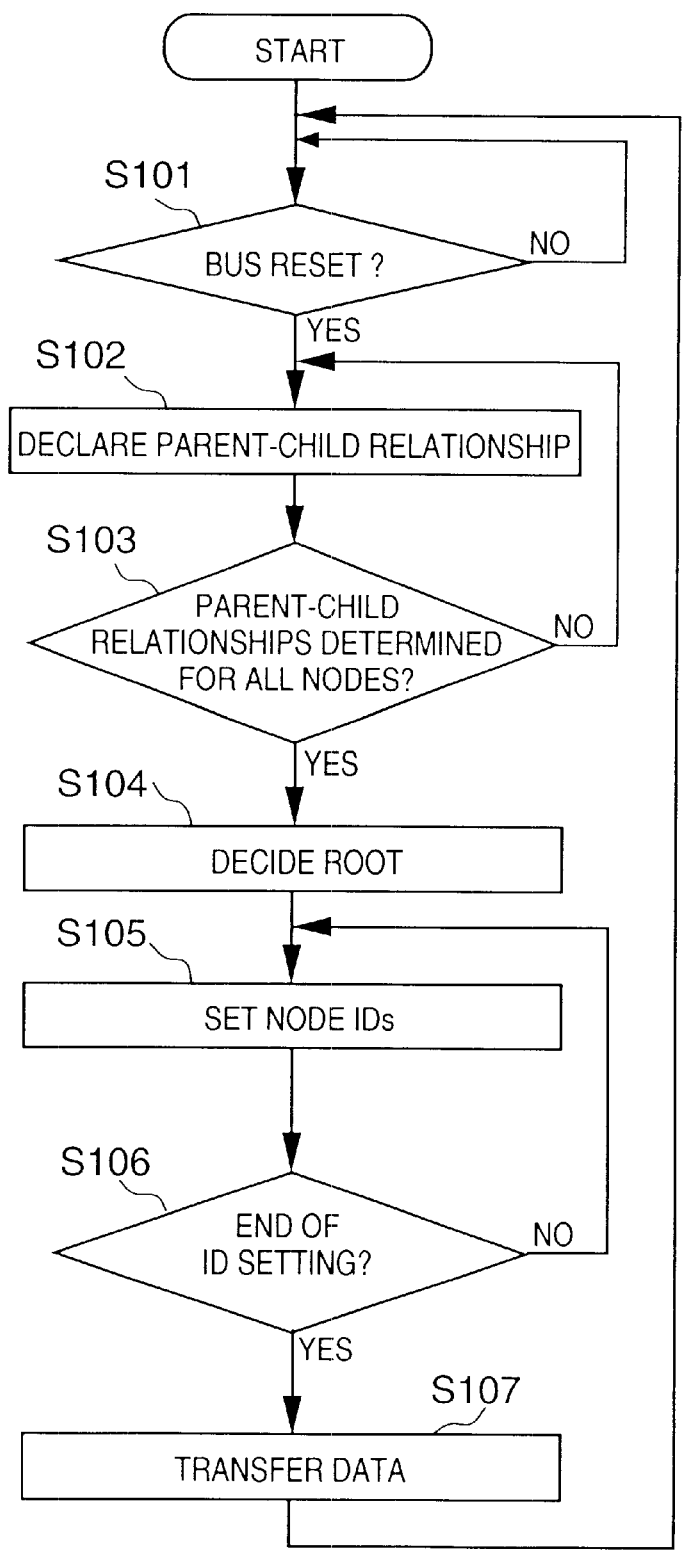
FIG. 7 is a flowchart illustrating a general sequence from bus reset to determination of a node ID.

The flowchart of FIG. 7 illustrates a series of bus operations from occurrence of bus reset to determination of node IDs and data transfer.

First, occurrence of bus reset within the network is monitored constantly at step S101. Control proceeds to step S102 when bus reset occurs as a result of a node power supply being turned on or off, etc.

A declaration of parent-child relationship is made between directly connected nodes in order to ascertain the status of the connections of the new network from reset state of the network. If the parent-child relationships have been determined between all nodes at step S103, one root is decided at step S104. Until the parent-child relationships are determined between all nodes, the declaration of the parent-child relationship at step S102 is repeated and a root is not decided.

When a root is decided at step S104, a node-ID setting operation for providing each node with an ID is carried out at step S105. Node IDs are set in a predetermined node sequence and the setting operation is performed repeatedly until all nodes have been provided with IDs. When the setting of IDs for all nodes is eventually completed at step S106, the new network configuration will have been recognized at all nodes and a state will be attained in which data transfer between nodes can be carried out at step S107. Data transfer thus begins.

When the state of step S107 is attained, a transition is again made to the mode in which the occurrence of bus reset is monitored. If bus reset occurs, the setting operation from step S101 to step S106 is repeated.

Figure 8:
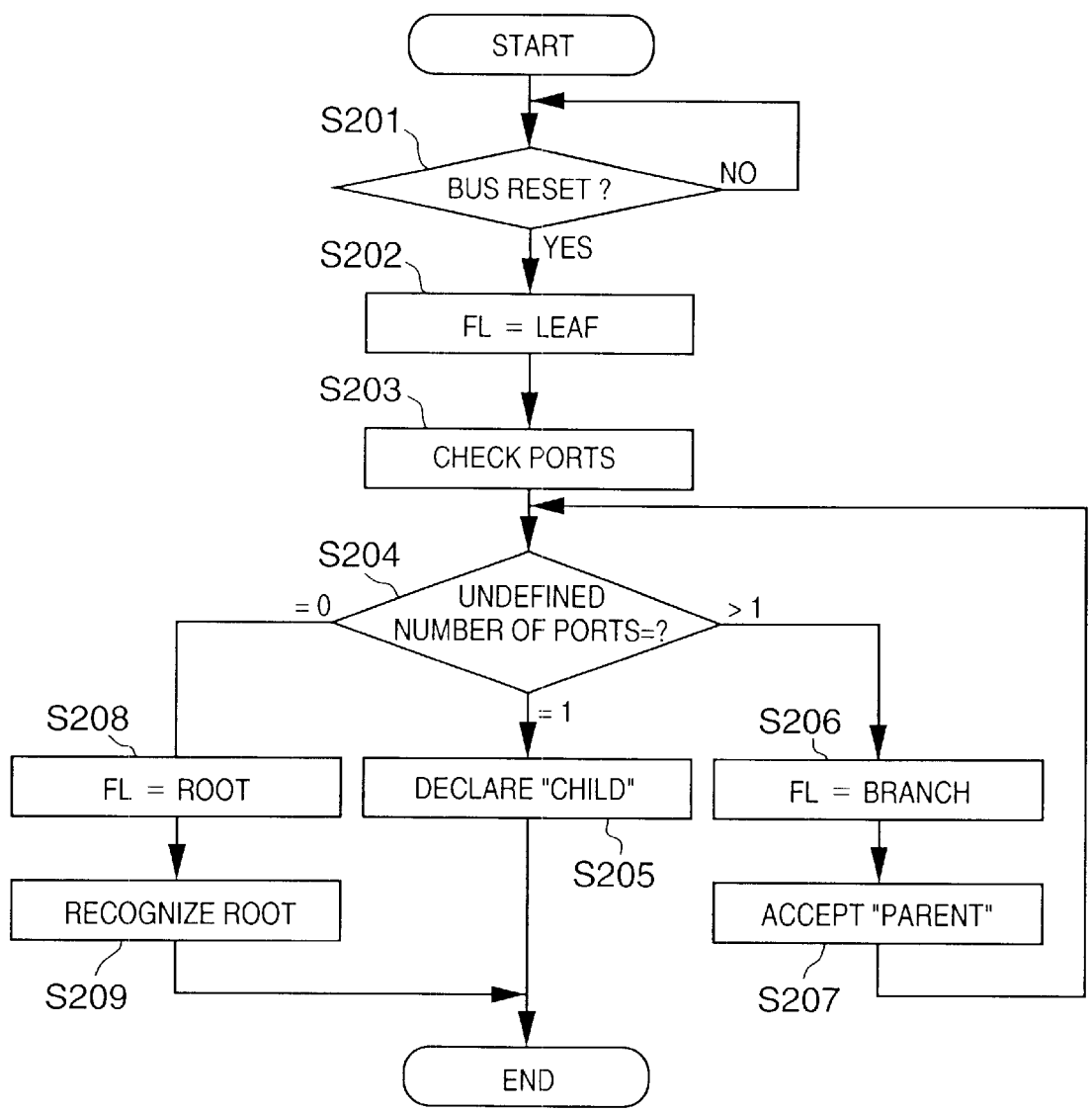
FIG. 8 is a flowchart illustrating a general sequence from bus reset to determination of a node ID.
Figure 9:
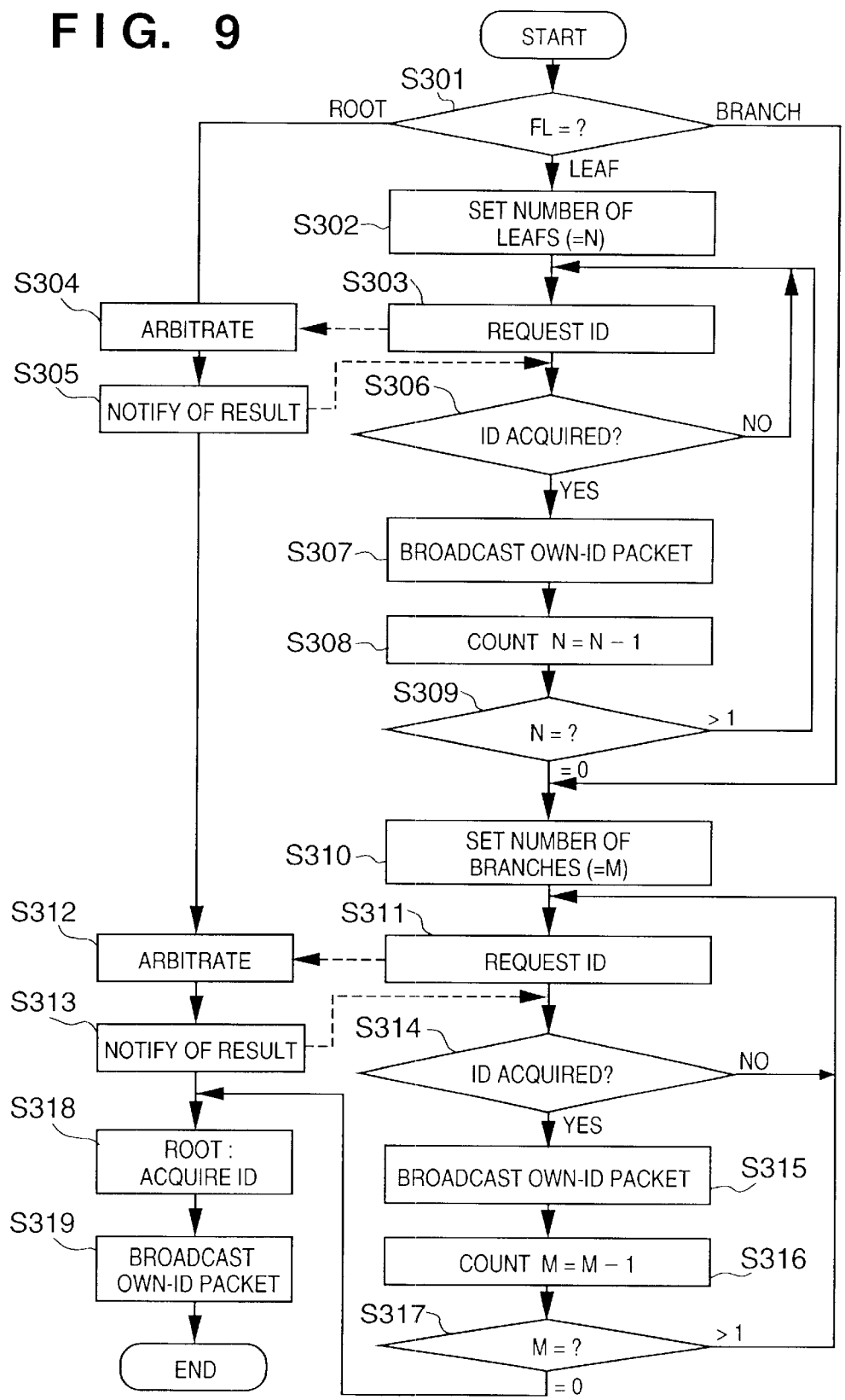
FIG. 9 is a flowchart illustrating a general sequence from bus reset to determination of a node ID.

The foregoing is a description of the flowchart of FIG. 7. The portion of this flowchart from bus reset to root determination and the procedure from the conclusion of root determination to the end of ID setting are illustrated in FIGS. 8 and 9, respectively, when expressed more precisely in flowchart form.

The flowchart of FIG. 8 will now be described.

When a bus reset occurs at step S201, the network configuration is reset temporarily. It should be noted that occurrence of bus reset is constantly monitored at step S201.

Next, at step S202, a flag indicative of a leaf node is set for each device as the first step of an operation for re-recognition of the topology of the reset network. Furthermore, at step S203, each device determines how many of its own ports have been connected to other devices.

This is followed by step S204, at which the number of undefined ports (ports for which the parent-child relationship has not been determined) is checked, based upon the number of ports obtained at step S203, in order to begin the ensuing declaration of parent-child relationship. After bus reset, the number of ports will be equal to the number of undefined ports. However, as parent-child relationships are decided, the number of undefined ports sensed at step. S204 changes.

Immediately after bus reset, nodes which can make declarations of parent-child relationship first are limited to leafs. A node can ascertain that it is a leaf from examining the number of connected ports at step S203. The leaf declares with respect to a node connected to it that "I am the child and the other node is the parent" at step S205. This operation then ends.

With regard to a node whose number of connected ports is found to be plural at step S203, meaning that the node has been identified as a branch point, the number of undefined ports after bus reset is found to be greater than 1 at step S204. As a result, control proceeds to step S206. First a flag indicative of a branch is set at step S206. This is followed by step S207, at which the node waits for acceptance of "Parent" in the declaration of the parent-child relationship from a leaf. The leaf makes the declaration of the parent-child relationship and the branch that received this at step S207 checks the number of undefined ports at step S204. If the number of undefined ports is 1, it is possible to declare "I am a child" at step S205 to the node connected to the remaining port. If, from the second time onward, there are two or more branches when the number of undefined ports is checked at step S204, the node again waits in order to accept "Parent" from a leaf or from another branch at step S207.

Finally, when any one branch or, in exceptional cases, a leaf (because the node did not operate quickly enough to issue the "Child" declaration) indicates zero as the number of undefined ports at step S204, the declarations of the parent-child relationship for the entire network end as a result. The sole node for which the number of undefined ports has become zero (i.e., for which all of the ports have been determined to be parent ports) has a root flag set for it at step S208, and this node is recognized as a root at step S209. Thus ends the processing of FIG. 8 from bus reset to declaration of the parent-child relationships between all nodes of the network.

The flowchart of FIG. 9 will now be described.

In the sequence up to FIG. 8, information on the flags of all nodes that indicates whether a node is a leaf, a branch or a root is set. The nodes are classified on the basis of this information at step S301. In the operation of assigning an ID to each node, the node for which an ID can be set first is a leaf. The setting of IDs is performed in the order leaf→branch→root starting from younger numbers (from a node number 0).

The number N (where N is a natural number) of leafs that exist in the network is set at step S302. Each leaf then requests the root to be given an ID at step S303. In a case where there are a plurality of requests, the root performs arbitration (an operation to decide on any one node) at step S304. An ID number is assigned to the one winning node and the losing nodes are so notified at step S305. A leaf whose acquisition of an ID ended in failure at step S306 issues an ID request again. The foregoing operation is then repeated.

A leaf that has acquired an ID transfers the ID information of this node to all nodes by a broadcast at step S307. When the broadcast of the ID information of one node ends, the number of remaining leafs is reduced by one at step S308. If the number of remaining leafs is found to be one or more at step S309, operation is repeated from the ID request at step S303. When all leafs have finally broadcast ID information, N becomes equal to 0 at step S309 and control then proceeds to the setting of branch IDs.

The setting of branch IDs is performed in a manner similar to that for leafs. That is, the number M (where M is a natural number) of branches that exist in the network is set at step S310. Each branch then requests the root to be given an ID at step S311. In response, the root performs arbitration at step S312, and assigns the winning branch a number in order starting from younger numbers that follow those already assigned to leafs. The root notifies a branch that has issued a request of its ID number or of the fact that the request failed at step S313. A branch whose acquisition of an ID ended in failure at step S314 issues an ID request again. The foregoing operation is then repeated.

A branch that has acquired an ID transfers the ID information of this node to all nodes by a broadcast at step S315. When the broadcast of the ID information of one node ends, the number of remaining branches is reduced by one at step S316. If the number of remaining branches is found to be one or more at step S317, operation is repeated from the ID request at step S311. This operation is carried out until all branches eventually broadcast ID information. When all branches acquire node IDs, M becomes equal to 0 at step S317 and the mode for acquiring branch IDs ends.

When processing thus far ends, a node which has not yet acquired ID information is a root only. The root sets the largest unassigned number as its own ID number at step S318 and broadcasts the root ID information at step S319.

Thus, as shown in FIG. 9, the procedure up to the setting of IDs for all nodes following the parent-child relationship determinations ends.

Next, operation in an actual network shown in FIG. 10 will be described as one example.

Figure 10:
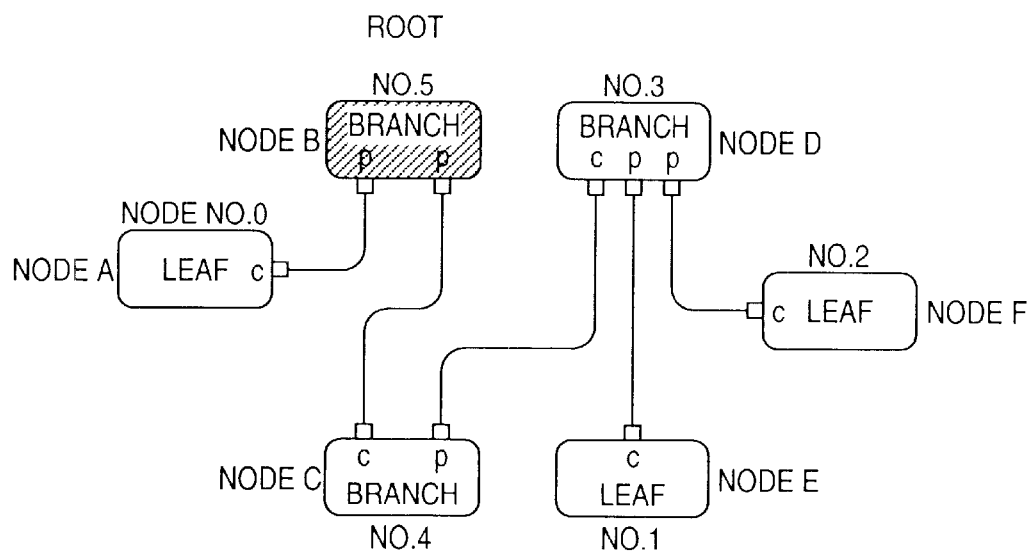
FIG. 10 is a diagram useful in describing a node-ID determination sequence.

The hierarchical structure described in FIG. 10 is such that nodes A and C are directly connected as inferior to node B (the root), node D is directly connected as inferior to node C, and nodes E and F are directly connected as inferior to node D. This hierarchical structure and a procedure for determining the route node and node IDs will be described below.

In order to recognize the connection status of each node after bus reset, a declaration of the parent-child relationship is made between the ports at which the nodes are directly connected. A parent has a superior status in the hierarchical structure and the child has an inferior status.

In FIG. 10, the node that issues the declaration on parent-child relationship first following bus reset is the node A. Basically, declaration of the parent-child relationship can be issued from a node (referred to as a leaf) having a connection at only one port. The node can ascertain this from the fact that is has only one port connected. In this way the node recognizes that it is at a terminus of the network and the parent-child relationships are determined one after another starting from those terminus nodes that go into operation earliest. Thus, the port on the side (node A of the nodes A and B) that has issued the declaration of the parent-child relationship is set as a child port, and the port on the side of the other party (node B) is set as a parent port. Accordingly, it is determined that nodes A and B are child-parent related, nodes E and D are child-parent related, and nodes F and D are child-parent related, respectively.

Nodes one layer higher have a plurality of connected ports. These nodes are referred to as branches. Among these nodes, those that have received declarations of the parent-child relationship from other nodes issue declarations of the parent-child relationship in succession and to their superiors. In FIG. 10, after node D is determined to be the parent in the D–E and D–F relationships, it issues the declaration of the parent-child relationship with respect to node C. As a result, the relationship determined between nodes D and C is child-parent, respectively.

Node C, which has received the declaration of parent-child relationship from node D, issues a declaration of parent-child relationship with regard to node B, which is connected to the other port of node C. As a result, it is determined that the relationship between nodes C and B is child-parent, respectively. Thus, the hierarchical structure of FIG. 10 is constructed and node B, which is the parent to all connected nodes, is eventually determined to be the root node. Only one root node can exist in one network configuration.

Node B in FIG. 10 has been determined to be the root node. If node B, which has received the declaration of parent-child relationship from node A, issues its declaration of parent-child relationship to other nodes at an early timing, there is the possibility that the root node will shift to another node. In other words, depending upon the timing at which the declaration is transmitted, any node can become the root node, and in one and the same network configuration, the root node is not always fixed.

After the root node is decided, a transition is made to a mode for deciding the node IDs. In this mode all nodes communicate their own node IDs to all other nodes. This is a broadcast function.

A node's own ID information includes its own node number, information on the position at which it has been connected, the number of ports it possesses, the number of ports connected or information on the parent-child relationship of each port. The procedure for assigning node ID numbers can be started from nodes (leafs) having only one of their ports connected. Node numbers 0, 1, 2, . . . are assigned to these nodes in regular order.

A node that has acquired a node ID broadcasts information inclusive of the node number to each of the other information inclusive of the node number to each of the other nodes. As a result, this ID number is recognized as being "already assigned". If all leafs have finished acquiring their own node IDs, then operation shifts to branches so that node ID numbers are assigned to branch nodes after leaf nodes. In a manner similar to that of the leafs, branches to which node ID numbers have been assigned broadcast their node ID information in succession. Finally, the root node broadcasts its own ID information. That is, the root always possesses the largest node ID number.

Thus, the assignment of the node IDs of the entire hierarchical structure ends, the network is reconstructed and the bus initialization operation is completed.

<Arbitration>

With a 1394 serial bus, arbitration for bus access is always carried out before data transfer. The 1394 serial bus is a logical bus-type network. In other words, each separately connected device relays a transferred signal, thereby transmitting the same signal to all devices in the network. Consequently, arbitration is necessary to prevent collision of packets. As a result, only one node can perform a transfer at a certain time.

Figure 11A:
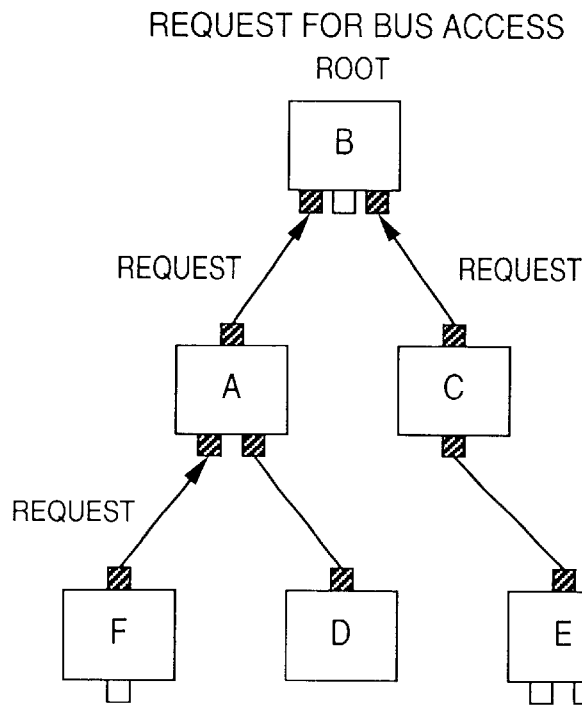
FIGS. 11A and 11B are diagrams useful in describing arbitration.
Figure 11B:
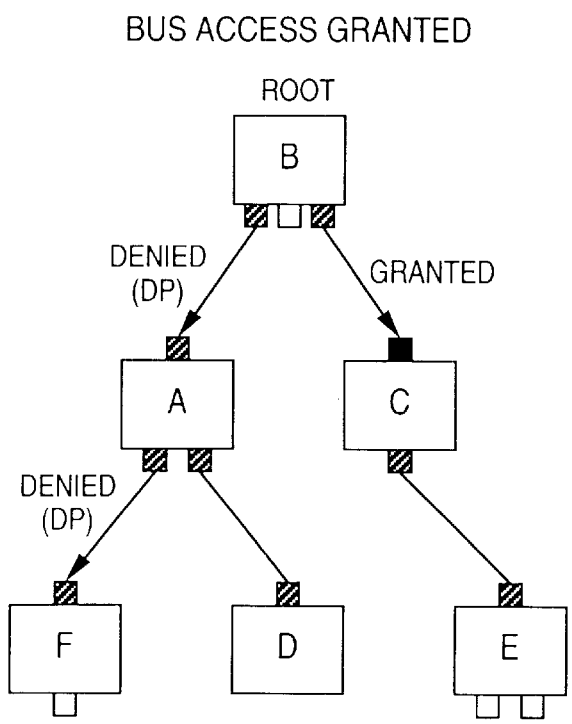

FIGS. 11A and 11B are diagrams useful in describing arbitration, in which FIG. 11A illustrates the situation when bus access bus is requested and FIG. 11B shows a situation in which bus access is allowed or refused in response to a request. Arbitration will now be described with reference to these diagrams.

When arbitration starts, one or a plurality of nodes each sends the parent node a request for bus access privilege. In FIG. 11A, nodes C and F are the nodes issuing bus access requests. A parent node (node A in FIG. 11) that has received a bus access request sends (relays) the request to its parent node. This request eventually arrives at the root that performs arbitration.

Upon receiving the bus access request, the root node decides which node should be granted access to the bus. Such arbitration is performed solely by the root node. The node that has won the arbitration is granted access to the bus. FIG. 11B shows that bus access has been granted to node C and denied to node F. A DP (Data Prefix) is sent to the node that lost the arbitration thereby informing this node of refusal. The bus access request from the refused node waits for the next arbitration. The node that won the arbitration and was granted bus access can start transferring data.

The flow of arbitration will be described with reference to the flowchart of FIG. 12.

In order for a node to be able to start data transfer, it is necessary that the bus be in an idle state. In order to recognize that the bus is currently idle following the end of a data transfer performed previously, each node judges that its own transfer can start based upon elapse of a predetermined idle-time gap length (e.g., a subaction gap) set separately in each transfer mode.

First, at step S401, it is determined whether the predetermined gap length has been obtained. The gap length conforms to the data to be transferred, which is asynchronous data or isochronous data. As long as the predetermined gap length is not obtained, bus access needed to begin a transfer cannot be requested. Accordingly, the node waits until the predetermined gap length is obtained.

If the predetermined gap length is obtained at step S401, it is determined at step S402 whether there is data to be transferred. If there is such data, then, at step S403, the root is sent a bus access request so as to reserve the bus for the transfer. The signal representing the bus access request eventually arrives at the root while being relayed through each device in the network, as shown in FIG. 11. If it is found at step S402 that there is no data to be transferred, the node stands by.

Next, if the root receives one or more bus access requests from step S403 at step S404, then, at step S405, the root checks the number of nodes that issued access requests. If it is found at step S405 that the number of nodes is equal to 1 (i.e., that one node issued a bus access request), then this node is provided with the bus access that will be allowed next. If it is found at step S405 that the number of nodes is greater than 1 (i.e., that a plurality of nodes issued bus access requests), then the root performs arbitration at step S406 to decide one node that is to be granted bus access. This arbitration operation assures that all devices have fair access to the bus and does not grant access only to the same node every time.

This is followed by step S407, at which the one node granted bus access by arbitration performed at step S406 by the root and the other nodes that lost the arbitration are separated from the plurality of nodes that issued the bus access requests. Next, at step S408, the root sends an enable signal to the one node that was granted bus access by arbitration or to a node that obtained bus access without arbitration because it was found at step S405 that the number of nodes requesting access is equal to one. The node that has obtained the enable signal immediately starts transferring data (a packet) that is to be transferred. A node that lost the arbitration at step S406 and was not granted bus access is sent the DP (Data Prefix) packet, which is indicative of failed arbitration, by the root at step S409. Upon receiving this packet, the node issues the bus access request again in order to perform a transfer. As a result, control returns to step S401 and the node stands by until the predetermined gap length is obtained.

<Asynchronous Transfer>

Figure 13:
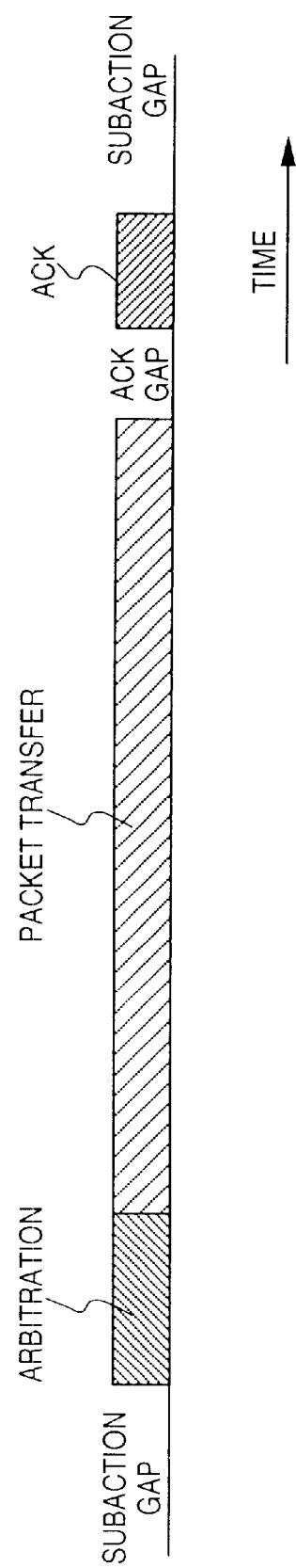
FIG. 13 is a diagram useful in describing asynchronous transfer.

Asynchronous transfer is transfer that is not synchronous. FIG. 13 illustrates the state of temporal transition in asynchronous transfer. An initial subaction gap in FIG. 13 indicates the idle state of the bus. At the moment idle time attains a fixed value, a node wishing to perform a transfer judges that the bus can be used and executes arbitration for bus acquisition.

When bus access is granted by arbitration, transfer of data is executed in a packet format. After data is transferred, a node that has received the data responds by sending back acknowledgment "ack" (a code sent back to acknowledge reception) regarding the transferred data, or by sending a response packet, after a short gap referred to as an "ack gap". Here "ack" comprises 4-bit information and a 4-bit checksum. Further, "ack" includes information such as success, busy state and pending state, etc., and is sent back immediately to the node that was the source of the transmission.

Figure 14:
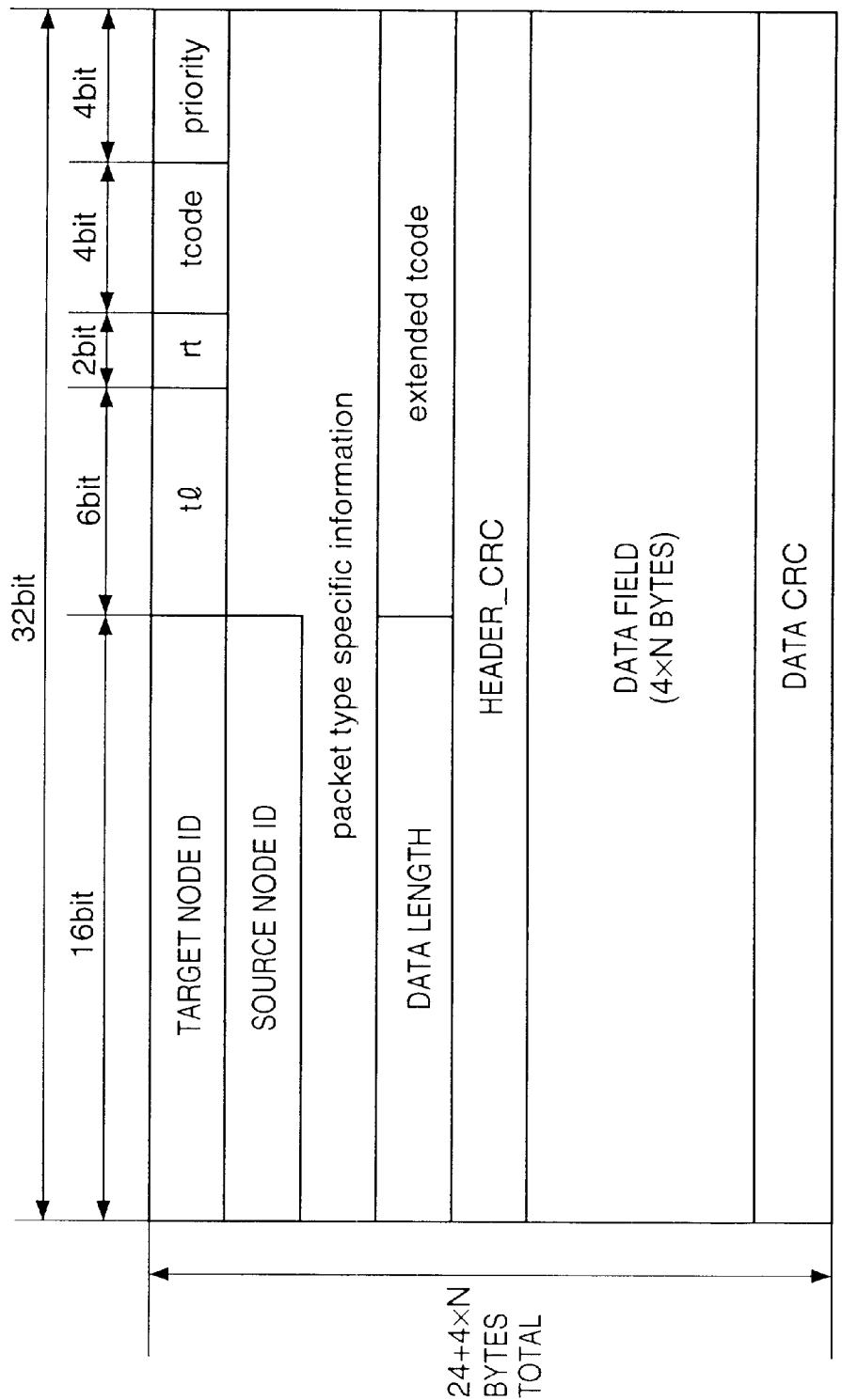
FIG. 14 is a diagram showing an example of packet format in asynchronous transfer.

FIG. 14 illustrates an example of the packet format for asynchronous transfer. A packet has a header portion in addition to a data field and data CRC that is for error correction. As shown in FIG. 14, a target node ID, a source node ID, transfer data length and various codes are written in the header in order to be transferred. Asynchronous transfer is one-to-one communication from one node to another. A packet that has been transferred from a node that was the source of the transfer is delivered to each node in the network. However, since addresses other than a node's own address are ignored, only the one node at the destination is read in.

<Isochronous Transfer>

Isochronous transfer is transfer that is synchronous. Isochronous transfer, which can be said to be the most significant feature of the 1394 serial bus, is a transfer mode suited to the transfer of data that requires real-time transfer, such as multimedia data composed of video data and audio data.

Whereas asynchronous transfer is one-to-one transfer, isochronous transfer is a transfer from one node that is the source of the transfer to all other nodes by means of a broadcast function.

Figure 15:
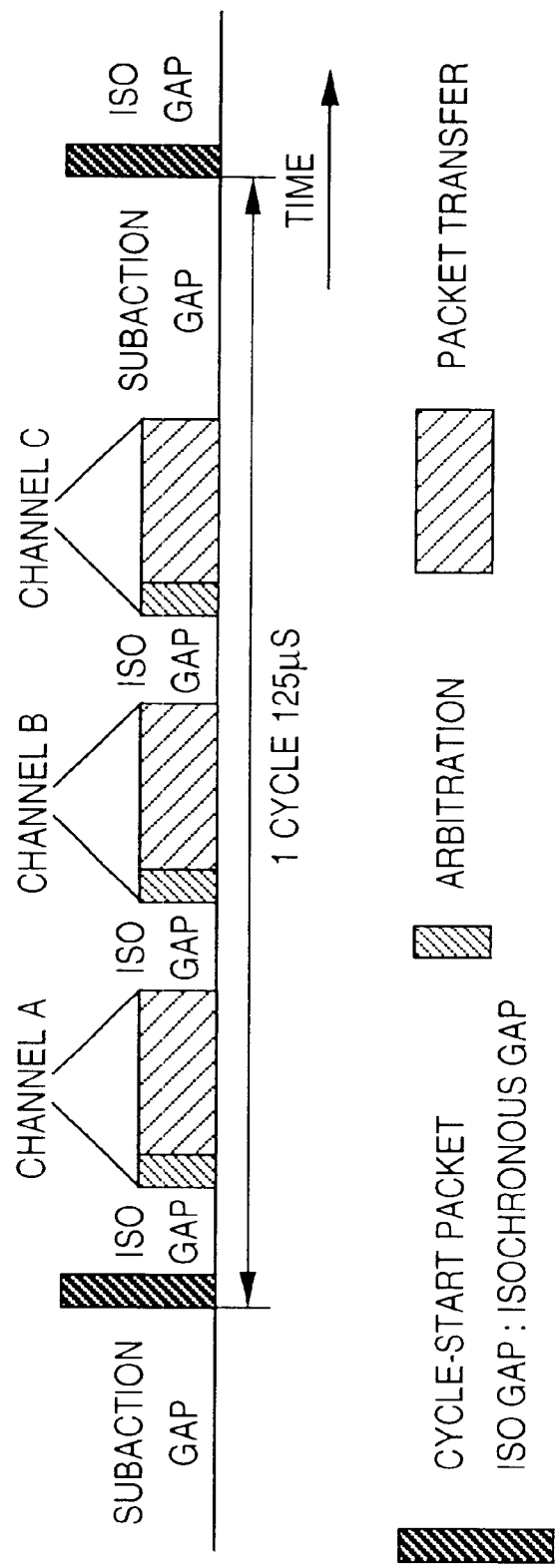
FIG. 15 is a diagram useful in describing isochronous transfer.

FIG. 15 illustrates the state of temporal transition in isochronous transfer.

Isochronous transfer is executed over a bus at fixed times. The time interval is referred to as an "isochronous cycle", the duration of which is 125 μs. The role of a cycle-start packet is to indicate the starting time of each cycle and to perform a time adjustment for each node. A node referred to as the "cycle master" transmits the cycle-start packet. The cycle master transmits the cycle-start packet, which informs of the start of the present cycle, upon elapse of a predetermined idle time (the subaction gap) following the end of transfer in the immediately preceding cycle. The time interval in which the cycle-start packet is transmitted is 125 μs.

In FIG. 15, a plurality of various packets can be transferred in one cycle upon being distinguished from one another by assigning channel IDs to them in the manner of channel A, channel B and channel C, as illustrated. This makes it possible to perform real-time transfer among a plurality of nodes simultaneously. In addition, a receiving node reads in only the data of the ID channel which it itself desires. The channel ID does not represent the address of the transmission destination but merely provides a physical number in regard to data. Accordingly, in transmission of a certain packet, transfer is performed by broadcast in such a manner that the packet is delivered from the one transmission-source node to all of the other nodes.

As in the manner of asynchronous transfer, arbitration is carried out before transmission of a packet in isochronous transfer. However, since this is not one-to-one communication as in asynchronous transfer, "ack" (the code sent back to acknowledge reception) does not exist in isochronous transfer. Further, the "iso gaps" (isochronous gaps) shown in FIG. 15 represent idle intervals necessary to verify that the bus is idle before an isochronous transfer is performed. When the predetermined idle time elapses, the node wishing to perform the isochronous transfer judges that the bus is idle. As a result, arbitration in advance of transfer can be executed.

Figure 16:
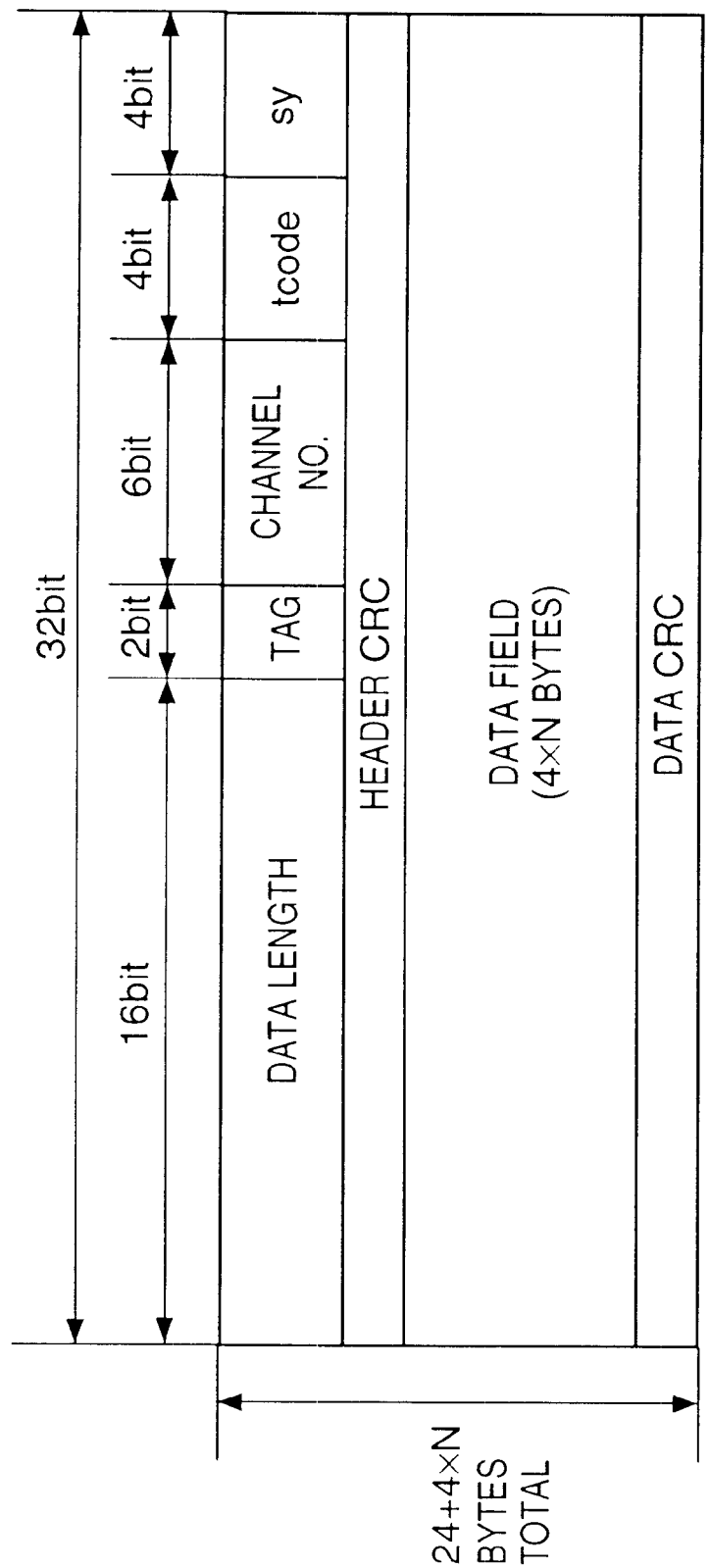
FIG. 16 is a diagram showing an example of packet format in isochronous transfer.

FIG. 16 illustrates an example of the packet format for isochronous transfer. Each of the various packets classified by their channels has a header portion in addition to a data field and data CRC that is for error correction. As shown in FIG. 16, transfer data length, channel number, various codes and an error correction header CRC are written in the header in order to be transferred.

<Bus Cycle>

Figure 17:
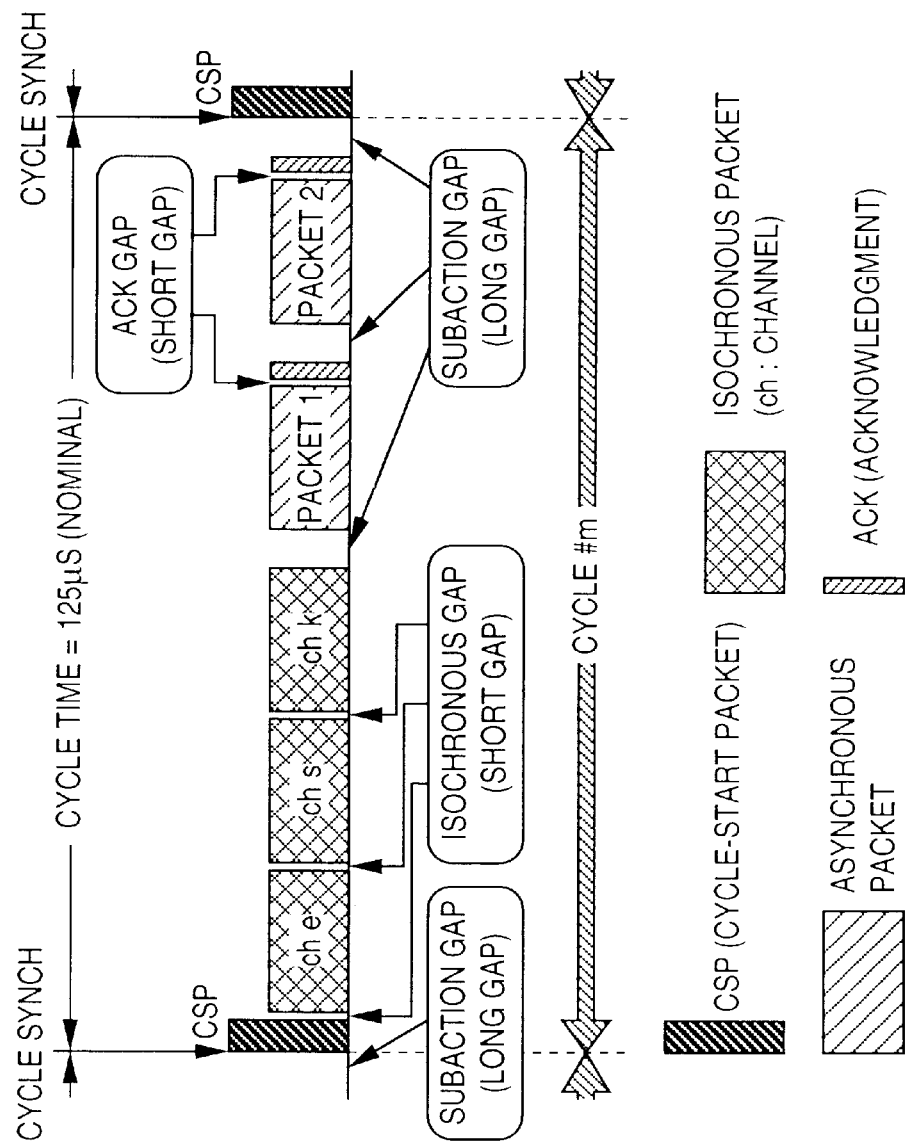
FIG. 17 is a diagram useful in describing a case where isochronous transfer and asynchronous transfer are mixed.

Transfer over an actual 1394 serial bus can be a mixture of isochronous transfer and asynchronous transfer. FIG. 17 illustrates the temporal transition of transfer on a bus over which isochronous transfer and asynchronous transfer are mixed.

Isochronous transfer is performed at a priority higher than that of asynchronous transfer. The reason for this is that after a cycle-start packet is issued, isochronous transfer can be started at a gap length (isochronous gap, or "iso gap") that is shorter than the gap length (subaction gap) of an idle interval necessary to start asynchronous transfer. Accordingly, priority is given to isochronous transfer over asynchronous transfer.

In the usual bus cycle shown in FIG. 17, the cycle-start packet is transferred from the cycle master to each node at the start of cycle #m. As a result, a time adjustment is carried out at each node, a node that is to perform isochronous transfer carries out arbitration after waiting the predetermined idle time (isochronous gap) and then enters the packet transfer phase. In FIG. 17, channel e, channel s and channel k are transferred isochronously in the order mentioned.

After the operation from arbitration to packet transfer has been repeated a number of times equal to the number of channels given and all isochronous transfers in cycle #m end, asynchronous transfer can be carried out.

As a result of idle time becoming equal to the subaction gap that makes asynchronous transfer possible, a node that desires to perform an asynchronous transfer judges that a transition has been made to execution of arbitration. However, asynchronous transfers can be made only in a case where the subaction gap for activating asynchronous transfer is obtained in a period of time from the end of an isochronous transfer to the moment (cycle synch) at which the next cycle-start packet is to be transferred.

In the cycle #m in FIG. 17, three channels of isochronous transfers and the subsequent asynchronous transfers (inclusive of ack) transfer two packets (packet 1 and packet 2). Following the asynchronous packet 2, the time (cycle synch) at which cycle #m+1 is to start arrives. As a result, transfer in cycle #m ends at this point.

However, if the time (cycle synch) at which the next cycle-start packet is to be transmitted has arrived during an asynchronous or isochronous transfer operation, the transfer operation is not forcibly interrupted and the cycle-start packet of the next cycle is transmitted after waiting the idle time that follows the end of transfer. In other words, when the first cycle continues for more 125 μs, the next cycle is made correspondingly shorter than the standard 125 μs. That is, the isochronous cycle can be made longer or shorter than the reference 125 μs.

If isochronous transfer is necessary every cycle in order to maintain real-time transfer, then it is executed without fail. As a result of cycle time being shortened, there are also occasions where asynchronous transfer is held over to the ensuing cycle. Such delay information also is managed by the cycle master.

Figure 18:
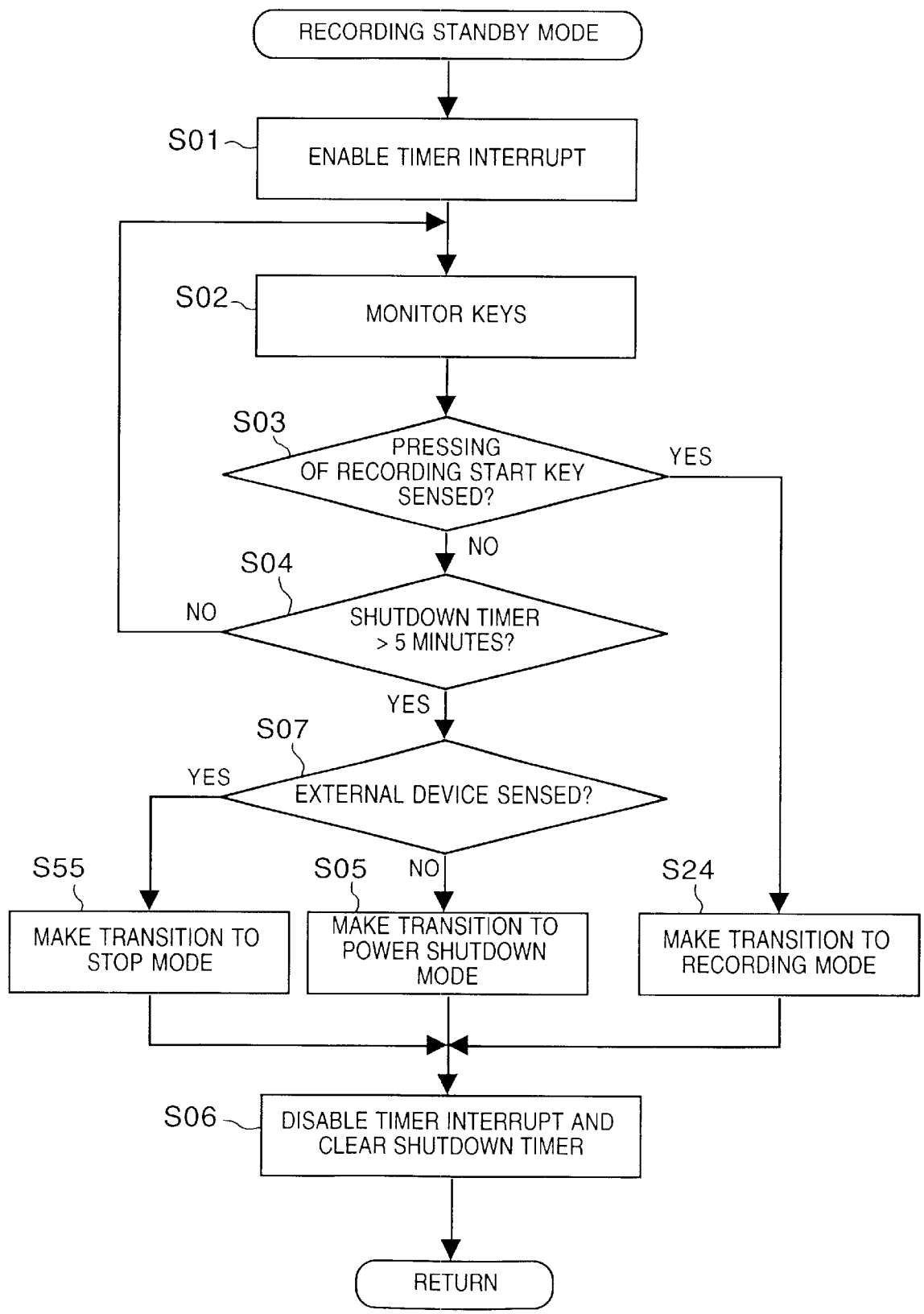
FIG. 18 is a flowchart illustrating operation of a system controller which controls the image sensing apparatus in the first embodiment of the present invention.

FIG. 18 is a flowchart illustrating operation of the system controller 10 in a case where transition to the recording playback mode has been selected in response to a key being pressed by the operator. The control operation of the system controller 10 in the recording standby mode will be described with reference to FIG. 18.

When a transition to the recording standby mode is selected in response to a key being pressed by the operator, the system controller 10 enables a timer interrupt in order to measure the recording standby time at step S01 in FIG. 18.

Figure 19:
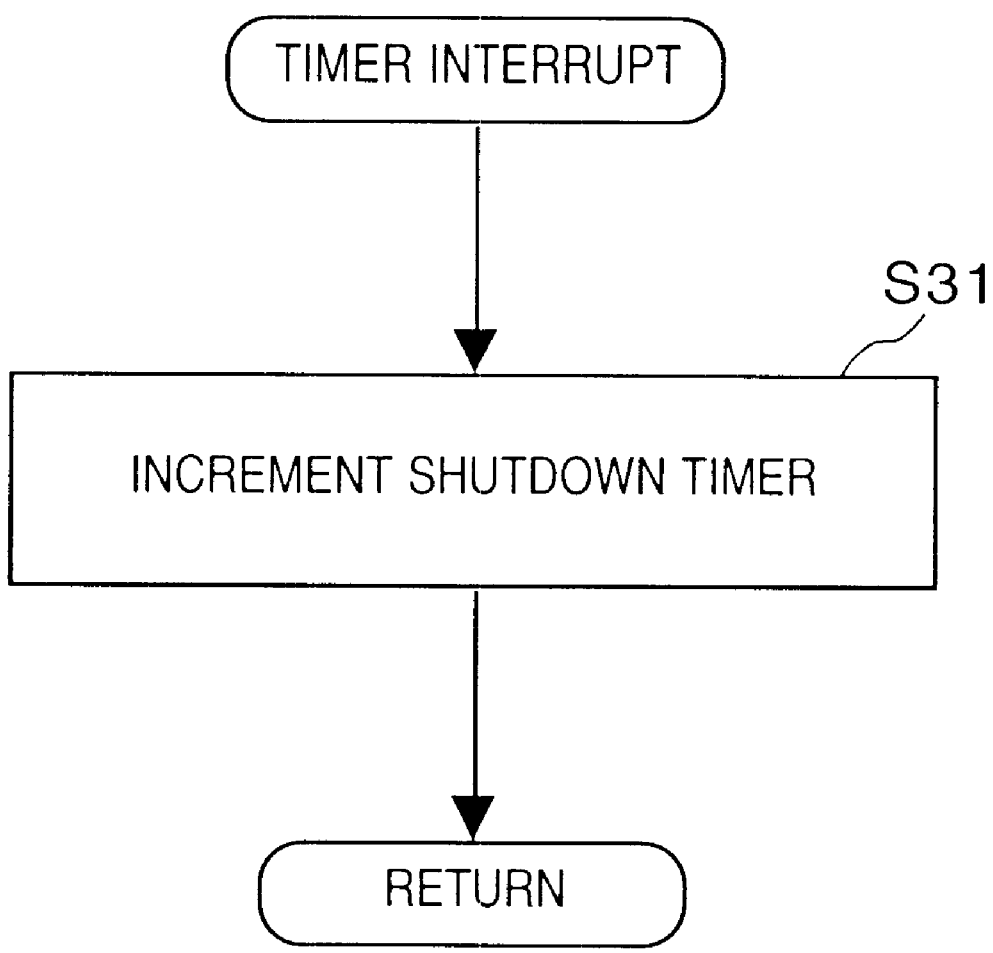
FIG. 19 is a flowchart useful in describing a timer interrupt step.

The timer interrupt is generated at any set time period. As shown in FIG. 19, the shutdown timer is incremented at step S31 within the interrupt.

Next, the system controller 10 monitors the recording start key at step S02. If an input from this key is sensed, a transition is made from the recording standby mode to the recording mode at step S24. By controlling the recorder controller in the recording mode, the capstan motor is started and recording of photographic image data on the magnetic tape serving as the recording medium is performed via the recording head.

At this time the timer interrupt is disabled and the shutdown timer is cleared at step S06. If an input from a key is not sensed at step S03, the shutdown timer is monitored. If it is determined that the value measured by the shutdown timer is less than 5 minutes, control returns to step S02. On the other hand, if it is determined that the recording standby mode has continued for five minutes or more, whether a connection to an external device has been made is sensed at step S07. This determination is made by sensing whether or not there is a bias voltage on the 1394 connector board.

If connection to an external device has been sensed, a transition is made from the recording standby mode to the STOP mode at step S55. By controlling the power supply unit 9 in the STOP mode, the supply of power to the recorder controller 4 is turned off and the rotation of the drum motor is halted. If connection to an external device is not sensed, however, a transition is made from the recording standby mode to a power shutdown mode, at step S05. By controlling the power supply unit 9 in the power shutdown mode, supply of power to the camera controller 2, signal processor 3, recorder controller 4 and digital interface 8 is turned off. At this time the timer interrupt is disabled at step S06 and the shutdown timer is cleared. This series of processing steps completes the operation for conserving power and preventing tape wear.

In accordance with this embodiment, as described above, a transition is made to the stop mode without executing shutdown processing in a case where connection to an external device has been sensed via the digital interface following elapse of a predetermined period of time in the recording standby mode. As a result, it is possible to avoid bus-reset processing which occurs on the network at timer shutdown.

Second Embodiment

A second embodiment of the present invention is implemented by a control system substantially the same as that in the case of the image sensing apparatus of the first embodiment shown in FIG. 1.

Figure 20:
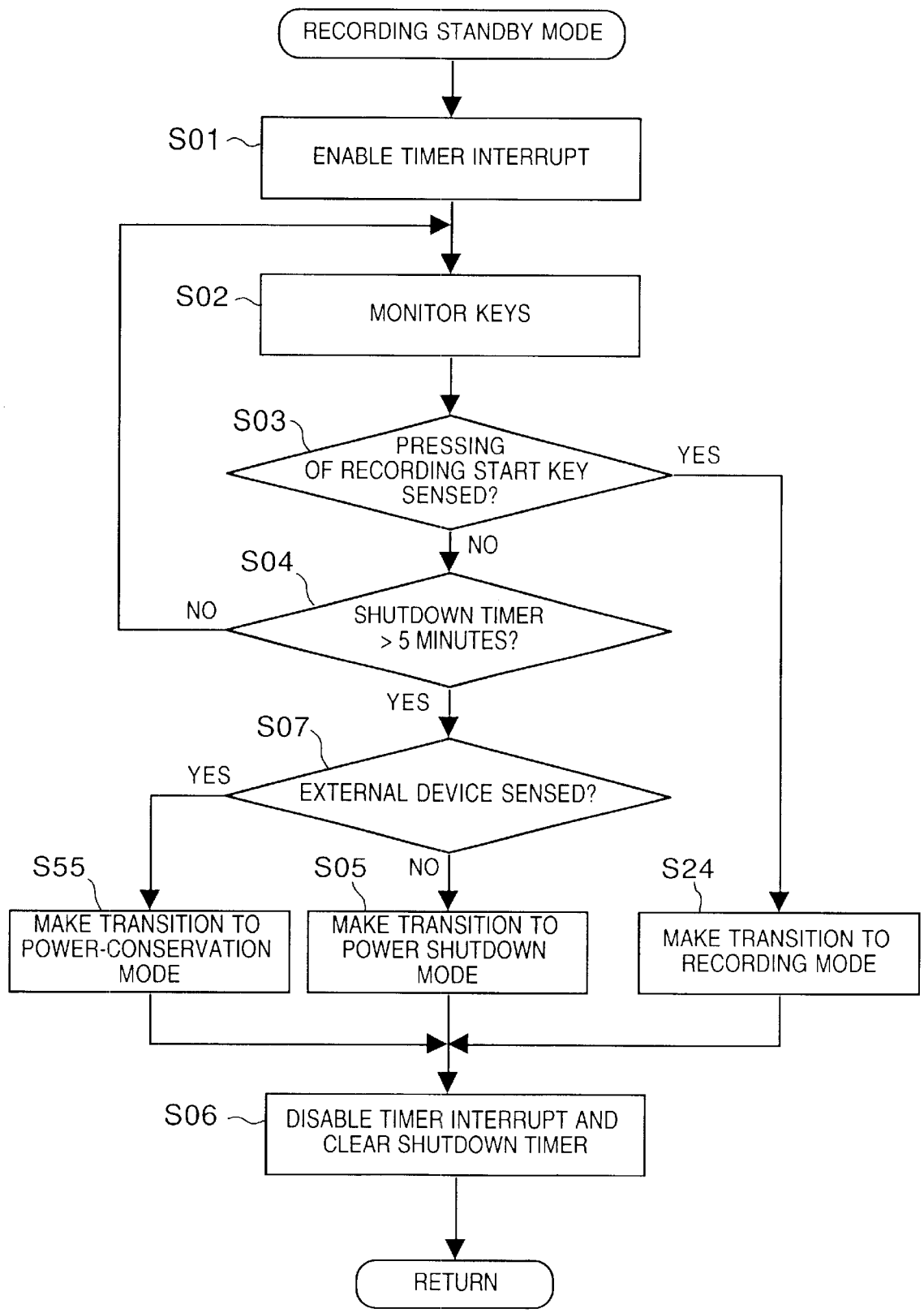
FIG. 20 is a flowchart illustrating the operation of a system controller which controls the image sensing apparatus in the second embodiment of the present invention.

FIG. 20 is a flowchart illustrating operation of the system controller 10 in a case where transition to the recording playback mode has been selected in response to a key being pressed by the operator. The control operation of the system controller 10 in the recording standby mode will be described with reference to FIG. 20.

When a transition to the recording standby mode is selected in response to a key being pressed by the operator, the system controller 10 enables a timer interrupt in order to measure the recording standby time at step S01 in FIG. 19. The timer interrupt is generated at any set time period. In a manner similar to that shown in FIG. 19, the shutdown timer is incremented at step S31 within the interrupt.

Next, the system controller 10 monitors the recording start key at step S02. If an input from this key is sensed, a transition is made from the recording standby mode to the recording mode at step S24. By controlling the recorder controller in the recording mode, the capstan motor is started and recording of digital image data on the magnetic tape serving as the recording medium is performed via the recording head.

At this time the timer interrupt is disabled and the shutdown timer is cleared at step S06. If an input from a key is not sensed at step S03, the shutdown timer is monitored. If it is determined from the value measured by the shutdown timer that the recording standby time is less than 5 minutes, control returns to step S02. On the other hand, if it is determined that the recording standby mode has continued for five minutes or more, whether a connection to an external device has been made is sensed at step S07.

If connection to an external device has been sensed, a transition is made from the recording standby mode to a power-saving mode at step S55. By controlling the power supply unit 9 in the power-saving mode, the supply of power to the camera controller 2, signal processor 3 and recorder controller 4 is turned off. The output of the digital image data is suspended at the digital interface 8 and only bus-reset monitoring processing is executed in order to maintain the network configuration.

If connection to an external device is not sensed, however, a transition is made from the recording standby mode to a power shutdown mode at step S05. At this time the timer interrupt is disabled at step S06 and the shutdown timer is cleared. This series of processing steps completes the operation for conserving power and preventing tape wear.

It should be noted that the second embodiment is capable of being implemented even if use is made of the IEEE-1394 serial bus scheme adopted as the digital interface 8 in the first embodiment of the present invention.

In accordance with this embodiment, as described above, supply of power to the digital interface is continued without shutdown and interface processing continues in a case where connection to an external device has been sensed via the digital interface following elapse of a predetermined period of time in the recording standby mode. As a result, it is possible to avoid bus-reset processing which occurs on the network at timer shutdown.

Third Embodiment

Figure 21:
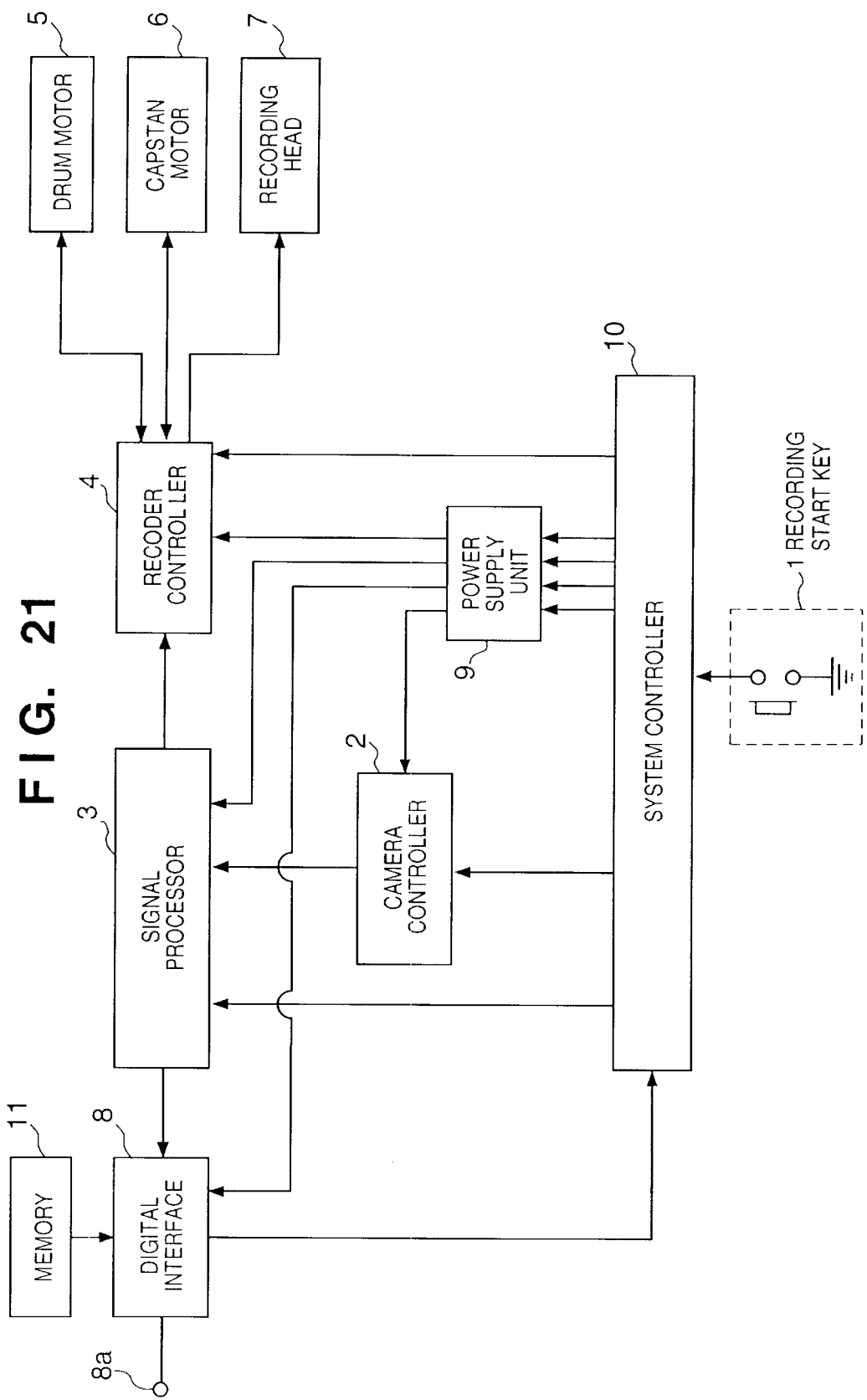
FIG. 21 is a block diagram showing the principal components of an image sensing apparatus according to a third embodiment of the present invention.

FIG. 21 is a block diagram showing the principal components of a camcorder equipped with a digital interface function and to which the first embodiment of the invention is applied. This arrangement is obtained by adding a memory 11 to the digital interface 8 the control system of the first embodiment, in which components identical to those of this embodiment are denoted by like reference characters. The digital interface 8 accepts warning data that has been stored in the memory 11, mixes this data with the digital image data and outputs the resulting data. The warning data that is written to the memory 11 can be set at will, examples of which are a shutdown request, a mode-transition request and a tape-wear warning.

Figure 22:
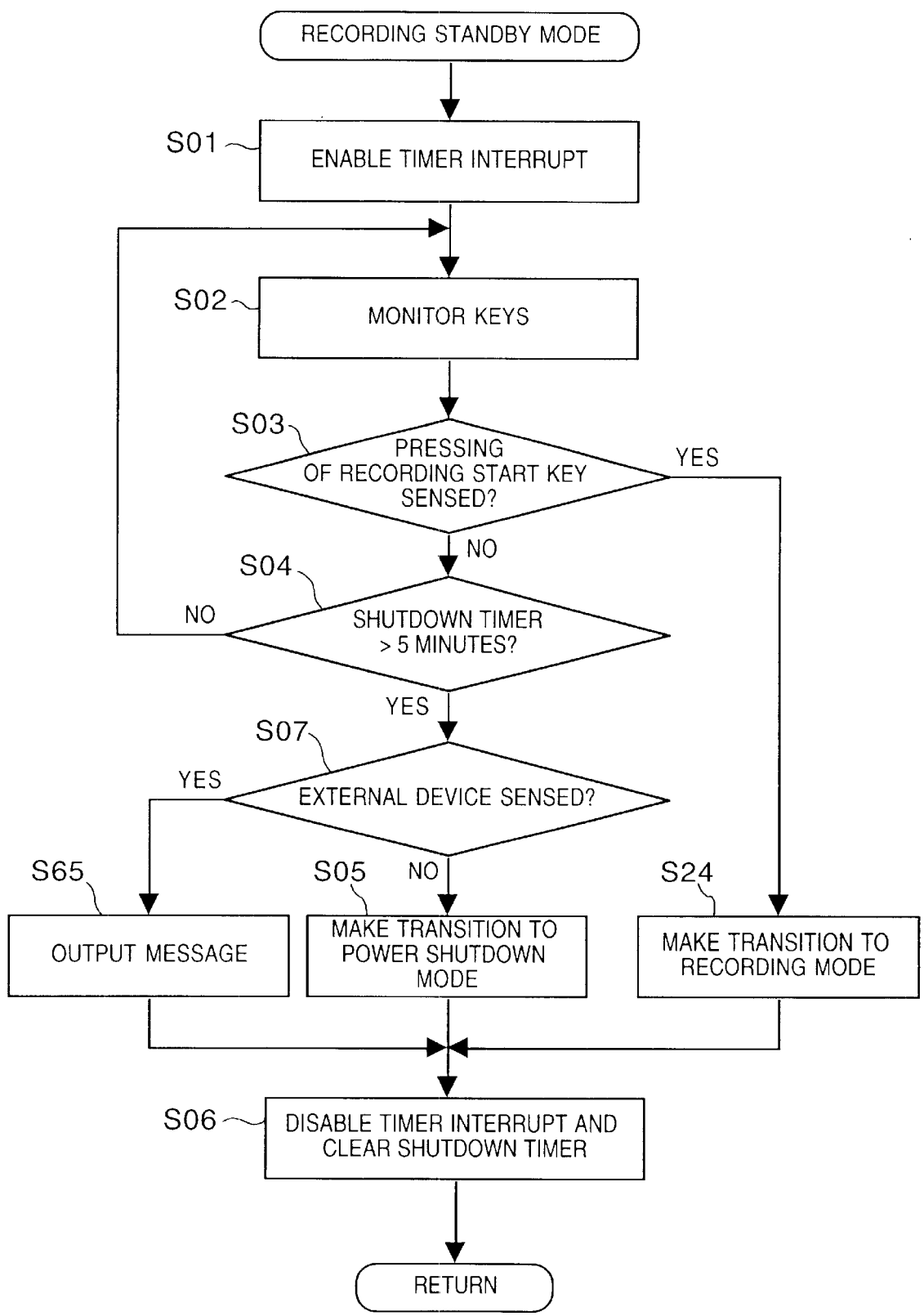
FIG. 22 is a flowchart illustrating the operation of a system controller which controls the image sensing apparatus in the third embodiment of the present invention.

FIG. 22 is a flowchart illustrating operation of the system controller 10 in a case where transition to the recording playback mode has been selected in response to a key being pressed by the operator. The control operation of the system controller 10 in the recording standby mode will be described with reference to FIG. 22.

When a transition to the recording standby mode is selected in response to a key being pressed by the operator, the system controller 10 enables a timer interrupt in order to measure the recording standby time at step S01 in FIG. 19. The timer interrupt is generated at any set time period. In a manner similar to that shown in FIG. 19, the shutdown timer is incremented at step S31 within the interrupt.

Next, the system controller 10 monitors the recording start key at step S02. If an input from this key is sensed, a transition is made from the recording standby mode to the recording mode at step S24. By controlling the recorder controller in the recording mode, the capstan motor is started and recording of digital image data on the magnetic tape serving as the recording medium is performed via the recording head.

At this time the timer interrupt is disabled and the shutdown timer is cleared at step S06. If an input from a key is not sensed at step S03, the shutdown timer is monitored. If it is determined from the value measured by the shutdown timer that the recording standby time is less than 5 minutes, control returns to step S02. On the other hand, if it is determined that the recording standby mode has continued for five minutes or more, whether a connection to an external device has been made is sensed at step S07.

If connection to an external device has been sensed, message output is selected at step S65 and the signal processor 3 mixes the warning data that has been stored in the memory 11 and the digital image data. At this time the timer interrupt is disabled at step S06 and the shutdown timer is cleared. This series of processing steps completes the operation for conserving power and preventing tape wear.

In accordance with this embodiment, as described above, a warning message is output without executing shutdown processing in a case where connection to an external device has been sensed by the digital interface following elapse of a predetermined period of time in the recording standby mode. As a result, it is possible to avoid bus-reset processing which occurs on the network at timer shutdown.

It should be noted that the third embodiment is capable of being implemented even if use is made of the IEEE-1394 serial bus scheme adopted as the digital interface 8 in the first embodiment of the present invention.

Other Embodiments

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the invention is applicable also to a case where the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes read from the storage medium implement the novel functions of the invention, and the storage medium storing the program codes constitutes the invention.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

In a case where the present invention is applied to the above-mentioned storage medium, program code corresponding to the above-described flowcharts (shown in FIGS. 7 to 9 or FIG. 12, 18, 19, 20 or 22) is stored on the storage medium.

Thus, in accordance with the present invention as described above, a signal processing apparatus capable of constructing a network by being connected to a plurality of external devices is characterized in that shutdown of a power is restricted if at least connection to an external device has been sensed, thereby curtailing bus reset of the network. This makes it possible to realize a favorable system construction in a case where the main unit of the apparatus and an external device have been connected via a digital interface in the recording standby mode.

The present invention is not limited to the above embodiments and various changes and modifications can be made within the spirit and scope of the present invention. Therefore, to apprise the public of the scope of the present invention, the following claims are made.

What is claimed is:

1. A signal processing apparatus capable of constructing a network by being connected to a plurality of external devices, wherein in a case where at least connection to an external device has been sensed when the apparatus is in an operation standby state, power shutdown is restricted to thereby curtail bus reset of the network.

2. The apparatus according to claim 1, comprising:
signal processing means for generating and processing a prescribed signal;
interface means for outputting a signal, which is output by said signal processing means, to an external device;
sensing means for sensing connection of the interface means to the external device; and
counting means;
wherein when said counting means counts a predetermined number in an operation standby mode, a transition is made from the operation standby mode to a stop or power-conservation mode in a case where connection to an external device has been sensed by said sensing means, and a transition is made from the operation standby mode to a power shutdown mode in a case where connection to an external device has not been sensed by said sensing means.

3. An image sensing apparatus comprising:
image signal processing means for generating and processing image information;
interface means for outputting a signal, which is output by said image signal processing means, to an external device; and
sensing means for sensing connection of said interface means to an external device;
wherein depending upon status of a connection to an external device, a transition is made from a first operating mode, in which the apparatus stands by for operation of said image signal processing means, to a second operating mode in which said image signal processing means is partially shut down or to a third operating mode in which power to the apparatus is cut off.

4. The apparatus according to claim 3, wherein a transition is made from the first opera ting mode to the second operating mode in a case where connection to an external device has been sensed by said sensing means in the first operating mode, and a transition is made from the first operating mode to the third operating mode in a case where connection to an external device has not been sensed by said sensing means in the first operating mode.

5. The apparatus according to claim 4, further comprising counting means, wherein when said counting means counts a predetermined number in the first operating mode, a transition is made from the first operating mode to the second operating mode in a case where connection to the external device has been sensed by said sensing means, and a transition is made from the first operating mode to the third operating mode in a case where connection to the external device has not been sensed by said sensing means.

6. The apparatus according to claim 3, wherein a camera controller, a signal processor and a recorder controller are included as said image signal processing means.

7. A method of controlling a signal processing apparatus capable of constructing a network by being connected to a plurality of external devices, wherein in a case where at least connection to an external device has been sensed when the apparatus is in an operation standby state, the apparatus is controlled so as to restrict power shutdown.

8. The method according to claim 7, wherein said signal processing apparatus has signal processing means for generating and processing a prescribed signal; interface means for outputting a signal, which is output by said signal processing means, to an external device; sensing means for sensing connection of the interface means to an external device; and counting means;
the image sensing apparatus being controlled in such a manner that when said counting means counts a predetermined number in an operation standby mode, a transition is made from the operation standby mode to a stop or power-conservation mode in a case where connection to an external device has been sensed by said sensing means, and a transition is made from the operation standby mode to a power shutdown mode in a case where connection to an external device has not been sensed by said sensing means.

9. A method of controlling an image sensing apparatus having image signal processing means for generating and processing image information; interface means for outputting a signal, which is output by said image signal processing means, to an external device; and sensing means for sensing connection of said interface means to an external device;
the image sensing apparatus being controlled in dependence upon status of a connection to an external device in such a manner that a transition is made from a first operating mode, in which the apparatus stands by for operation of said image signal processing means, to a second operating mode in which said image signal processing means is partially shut down or to a third operating mode in which power to the apparatus is cut off.

10. The method according to claim 9, wherein said image sensing apparatus is controlled in such a manner that a transition is made from the first operating mode to the second operating mode in a case where connection to an external device has been sensed by said sensing means in the first operating mode, and a transition is made from the first operating mode to the third operating mode in a case where connection to an external device has not been sensed by said sensing means in the first operating mode.

11. The method according to claim 10, wherein said image sensing apparatus further includes counting means, and the apparatus is controlled in such a manner that when said counting means counts a predetermined number in the first operating mode, a transition is made from the first operating mode to the second operating mode in a case where connection to the external device has been sensed by said sensing means, and a transition is made from the first operating mode to the third operating mode in a case where connection to the external device has not been sensed by said sensing means.

12. A storage medium storing a control program for controlling a signal processing apparatus capable of constructing a network by being connected to a plurality of external devices, wherein said control program has code of a step of restricting power shutdown in a case where at least connection to an external device has been sensed when the apparatus is in an operation standby state.

13. The storage medium according to claim 12, wherein said signal processing apparatus has signal processing means for generating and processing a prescribed signal; interface means for outputting a signal, which is output by said signal processing means, to an external device; sensing means for sensing connection of the interface means to an external device; and counting means;
said control program having code of a step in which when said counting means counts a predetermined number in an operation standby mode, a transition is made from the operation standby mode to a stop or power-conservation mode in a case where connection to an external device has been sensed by said sensing means, and a transition is made from the operation standby mode to a power shutdown mode in a case where connection to an external device has not been sensed by said sensing means.

14. A storage medium storing a control program for controlling an image sensing apparatus having image signal processing means for generating and processing image information; interface means for outputting a signal, which is output by said image signal processing means, to an external device; and sensing means for sensing connection of said interface means to an external device, wherein said control program has code of a step of causing a transition from a first operating mode, in which the apparatus stands by for operation of said image signal processing means, to a second operating mode in which said image signal processing means is partially shut down or to a third operating mode in which power to the apparatus is cut off, the transition depending upon status of a connection to an external device.

15. The storage medium according to claim 14, wherein said control program has code of a step of causing a transition from the first operating mode to the second operating mode in a case where connection to the external device has been sensed by said sensing means in the first operating mode, and from the first operating mode to the third operating mode in a case where connection to an external device has not been sensed by said sensing means in the first operating mode.

16. The storage medium according to claim 15, wherein said image sensing apparatus further includes counting means;
said control program having code of a step in which when said counting means counts a predetermined number in the first operating mode, a transition is made from the first operating mode to the second operating mode in a case where connection to the external device has been sensed by said sensing means, and a transition is made from the first operating mode to the third operating mode in a case where connection to the external device has not been sensed by said sensing means.

\* \* \* \* \*

UNITED STATES PATENT AND TRADEMARK OFFICE
CERTIFICATE OF CORRECTION

PATENT NO. : 6,412,076 B1   Page 1 of 1
DATED : June 25, 2002
INVENTOR(S) : Honda et al.

It is certified that error appears in the above-identified patent and that said Letters Patent is hereby corrected as shown below:

Column 4,
Line 10, "diagram,showing" should read -- diagram showing --

Column 8,
Line 38, "step. S204" should read -- step S204 --

Column 9,
Line 44, "to, leafs." should read -- to leafs. --

Column 18,
Line 64, "opera ting mode" should read -- operating mode --

Signed and Sealed this

Tenth Day of September, 2002

Attest:

Attesting Officer

JAMES E. ROGAN
*Director of the United States Patent and Trademark Office*